(12) United States Patent
Joo et al.

(10) Patent No.: US 11,513,676 B2
(45) Date of Patent: *Nov. 29, 2022

(54) METHOD AND SYSTEM FOR CONTROLLING DEVICE

(71) Applicant: SAMSUNG ELECTRONICS CO., LTD., Suwon-si (KR)

(72) Inventors: Yu-sung Joo, Yongin-si (KR); Yo-han Kim, Suwon-si (KR); Eun-kyo Baek, Seoul (KR); Jong-won Lee, Suwon-si (KR); Hyun-kwon Chung, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/038,862

(22) Filed: Sep. 30, 2020

(65) Prior Publication Data

US 2021/0011599 A1 Jan. 14, 2021

Related U.S. Application Data

(63) Continuation of application No. 14/955,663, filed on Dec. 1, 2015, now Pat. No. 10,824,323.

(30) Foreign Application Priority Data

Dec. 1, 2014 (KR) ........................ 10-2014-0169971

(51) Int. Cl.
*G06F 3/0488* (2013.01)
(52) U.S. Cl.
CPC .. *G06F 3/0488* (2013.01); *G06F 2203/04101* (2013.01)

(58) Field of Classification Search
CPC ........ G06F 3/041; G06F 3/048; G06F 3/0488; G06F 2203/04101; Y10S 707/913
See application file for complete search history.

(56) References Cited

U.S. PATENT DOCUMENTS

| 8,890,818 B2 | 11/2014 | Arrasvuori et al. |
| 9,063,563 B1 | 6/2015 | Gary |

(Continued)

FOREIGN PATENT DOCUMENTS

| CN | 102890605 A | 1/2013 |
| CN | 102981764 A | 3/2013 |

(Continued)

OTHER PUBLICATIONS

Search Report dated Mar. 11, 2016, issued by the International Searching Authority in counterpart International Patent Application No. PCT/KR2015/012929 (PCT/ISA/210).

(Continued)

*Primary Examiner* — Stacy Khoo
(74) *Attorney, Agent, or Firm* — Sughrue Mion, PLLC

(57) ABSTRACT

A method of controlling a device includes determining a distance between the device and a hovering inputter; determining 3-dimensional (3D) location information of a hovering input based on the distance; selecting a task among a plurality of tasks corresponding to an operation of an application executed by the device and the 3D location information of the hovering input; determining a class of an execution input according to the hovering input; and performing the selected task according to the determined class of the execution input.

21 Claims, 23 Drawing Sheets

(56) References Cited

U.S. PATENT DOCUMENTS

| | | | |
|---|---|---|---|
| 9,323,353 B1 | 4/2016 | Sivertsen | |
| 10,824,323 B2* | 11/2020 | Joo | G06F 3/0488 |
| 2008/0084400 A1 | 4/2008 | Rosenberg | |
| 2009/0058829 A1 | 3/2009 | Kim | |
| 2009/0058830 A1 | 3/2009 | Herz | |
| 2011/0035691 A1 | 2/2011 | Kim | |
| 2011/0128234 A1 | 6/2011 | Lipman | |
| 2012/0001875 A1 | 1/2012 | Li et al. | |
| 2012/0068941 A1 | 3/2012 | Arrasvuori | |
| 2012/0113056 A1 | 5/2012 | Koizumi | |
| 2012/0162225 A1 | 6/2012 | Yang et al. | |
| 2013/0024794 A1 | 1/2013 | Ha et al. | |
| 2013/0117717 A1 | 5/2013 | Song | |
| 2013/0147793 A1 | 6/2013 | Jeon et al. | |
| 2014/0053079 A1 | 2/2014 | Ollila et al. | |
| 2014/0096083 A1 | 4/2014 | Kim et al. | |
| 2014/0139440 A1 | 5/2014 | Qu et al. | |
| 2014/0267130 A1 | 9/2014 | Hwang et al. | |
| 2014/0282269 A1 | 9/2014 | Strutt et al. | |
| 2014/0325402 A1 | 10/2014 | Jung | |
| 2014/0351729 A1 | 11/2014 | Park | |
| 2015/0077339 A1 | 3/2015 | Kato | |
| 2015/0378581 A1* | 12/2015 | Dietz | G06F 3/0488 715/769 |

FOREIGN PATENT DOCUMENTS

| | | |
|---|---|---|
| CN | 103210366 A | 7/2013 |
| CN | 103713802 A | 4/2014 |
| CN | 103984465 A | 8/2014 |
| KR | 10-2011-0134810 A | 12/2011 |
| KR | 10-2013-0065047 A | 6/2013 |
| KR | 10-2014-0002283 A | 1/2014 |
| KR | 10-2014-0038932 A | 3/2014 |
| WO | 2014/189225 A1 | 11/2014 |

OTHER PUBLICATIONS

Communication dated Sep. 26, 2017, issued by the European Patent Office in counterpart European Application No. 15864428.6.

Communication dated Sep. 19, 2019 by the State Intellectual Property Office of P.R. China in counterpart Chinese Patent Application No. 201580070729.9.

Written Opinion dated Mar. 11, 2016, issued by the International Searching Authority in counterpart International Patent Application No. PCT/KR2015/012929 (PCT/ISA/237).

Communication dated Feb. 3, 2020, issued by the European Patent Office in counterpart European Application No. 19201385.2.

Communication dated Jun. 22, 2020 by the State Intellectual Property Office of P.R. China in counterpart Chinese Patent Application No. 201580070729.9.

Communication dated Mar. 16, 2021 issued by the Korean Intellectual Property Office in Korean English Application No. 10-2014-0169971.

Communication dated Oct. 21, 2021, issued by the European Patent Office in European Patent Application No. 19 201 385.2.

* cited by examiner

FIG. 6A
FIG. 6B
FIG. 6C
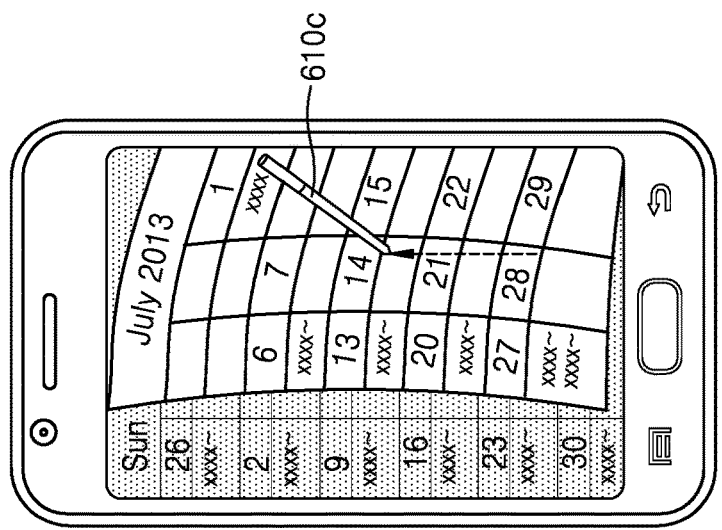
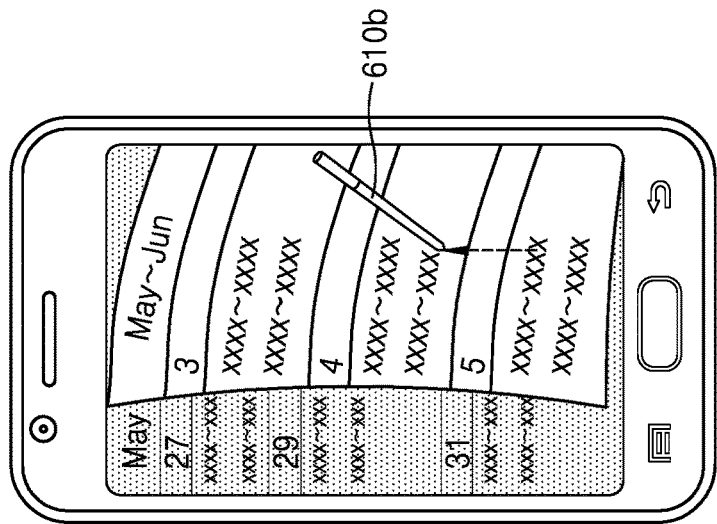
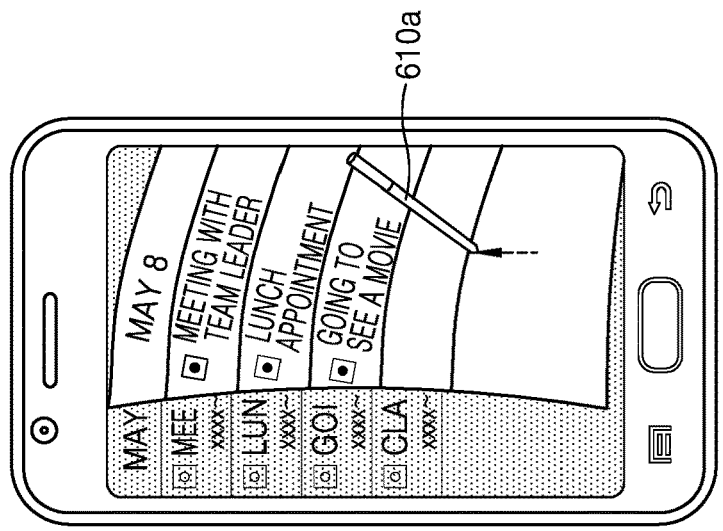

FIG. 13A
FIG. 13B
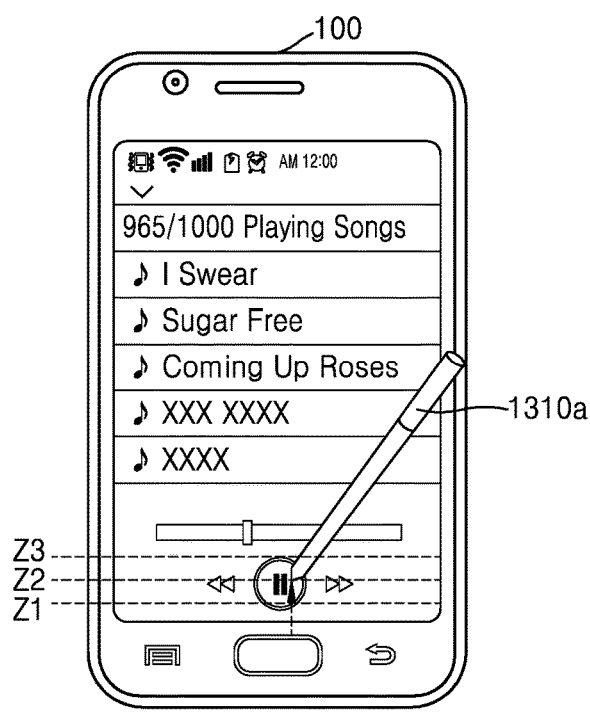
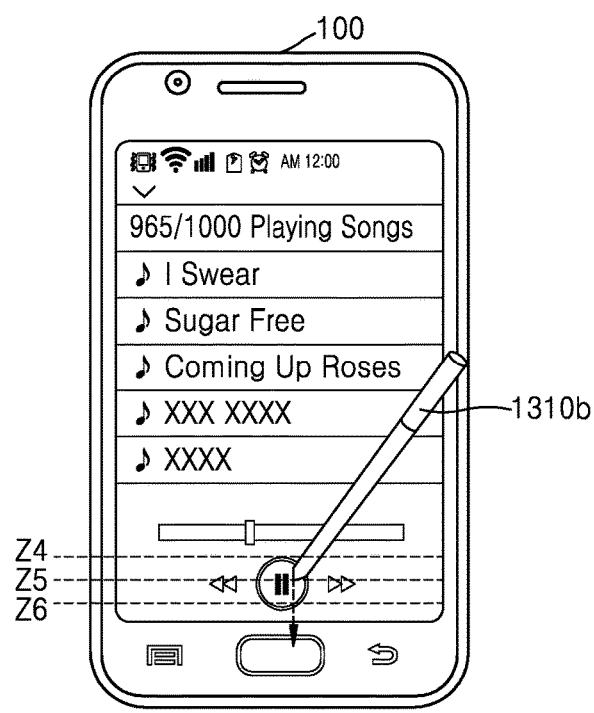

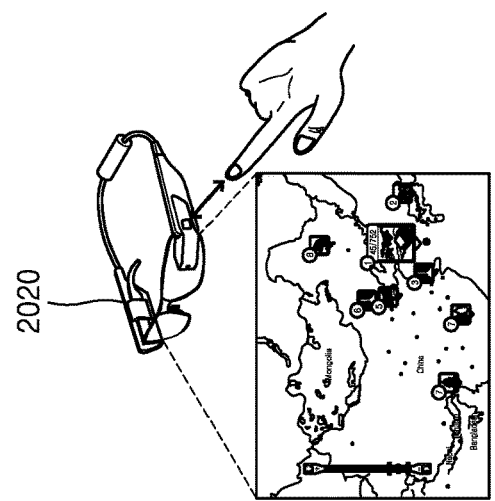
FIG. 20B
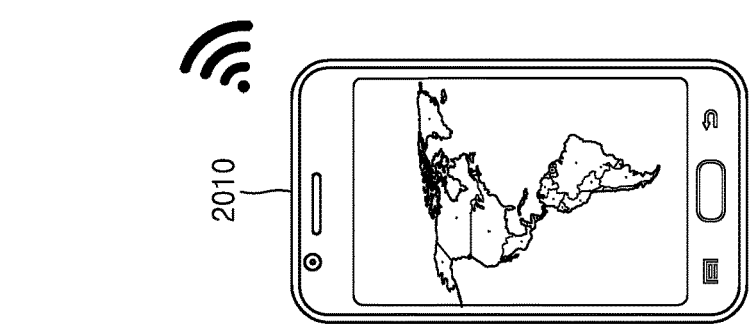
FIG. 20A
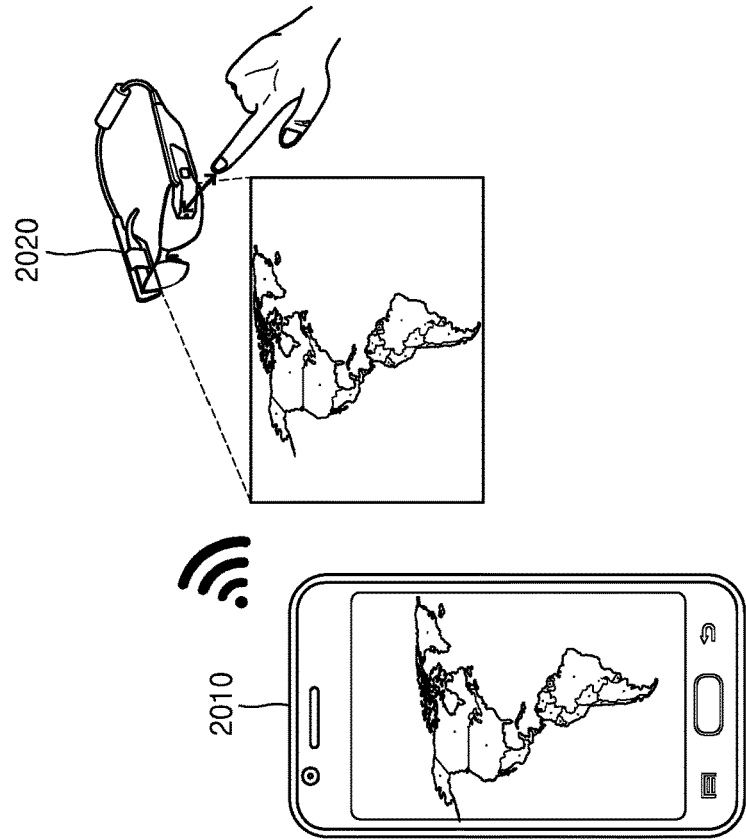

METHOD AND SYSTEM FOR CONTROLLING DEVICE

CROSS-REFERENCE TO RELATED APPLICATIONS

This application is a Continuation Application of U.S. application Ser. No. 14/955,663, filed on Dec. 1, 2015, which claims priority from Korean Patent Application No. 10-2014-0169971, filed on Dec. 1, 2014, in the Korean Intellectual Property Office, the disclosure of which is incorporated herein by reference in its entirety.

BACKGROUND

1. Field

Methods and apparatuses consistent with exemplary embodiments relate to a method and system for controlling a device.

2. Description of the Related Art

Due to developments in network and multimedia technologies, a user of a device may receive various services from service providing servers. Furthermore, as research is performed regarding devices along with the developments in network and multimedia technologies, many devices may provide various forms of interfaces to users.

Because devices provide various services and various user interfaces, user inputs in various forms may be used to control a device to receive desired services. As devices include various types of sensors, a technique for controlling a device by recognizing inputs in various forms to provide input interfaces suitable for user-accessible services has recently been introduced.

SUMMARY

Exemplary embodiments address at least the above problems and/or disadvantages and other disadvantages not described above. Also, the exemplary embodiments are not required to overcome the disadvantages described above, and may not overcome any of the problems described above.

Aspects of one or more exemplary embodiments relate to systems for controlling an object displayed on a device based on a hovering input obtained by the device.

Additional aspects will be set forth in part in the description that follows and, in part, will be apparent from the description, or may be learned by practice of one or more exemplary embodiments.

According to an aspect of an exemplary embodiment, there is provided a method of controlling a device, the method including determining a distance between the device and a hovering inputter; determining 3-dimensional (3D) location information of a hovering input based on the distance; selecting a task among a plurality of tasks corresponding to an operation of an application executed by the device and the 3D location information of the hovering input; determining a class of an execution input according to the hovering input; performing the selected task according to the determined class of the execution input.

The selecting the task may include determining an object, among one or more objects indicating the plurality of tasks, corresponding to a location of a hovering inputter; and selecting the task according to the determined object and the 3D location information of the hovering input.

The selecting the task may include selecting a task indicated by the determined object, and wherein the performing the selected task may include: determining a multiplier of the selected task using the 3D location information of the hovering input; and performing the selected task using the determined multiplier.

The plurality of tasks may be identified according to a second operation corresponding to a first operation of the application executed by the device.

The selecting the task may include, when the application is executed, selecting at least one application among a plurality of applications indicated by at least one object output by the device, based on the 3D location information of the hovering input.

The selecting the task may include receiving information regarding a moving direction of a hovering inputter; selecting a task corresponding to the moving direction of the hovering inputter; and performing the selected task based on the 3D location information of the hovering input.

The selecting the task may include determining a class of the hovering input based on a moving pattern of a hovering inputter; selecting at least one of the plurality of tasks corresponding to the class of the hovering input; and performing the selected task based on the 3D location information of the hovering input.

The determining the class of the execution input may include determining whether the hovering input corresponds to the execution input based on previously stored database of the application, wherein the performing the selected task may include: performing the selected task when the execution input corresponding to the hovering input is received.

According to an aspect of another exemplary embodiment, there is provided a method of controlling a device, the method including: determining characteristic information including 3D location information of a hovering input received by a first device; transmitting the characteristic information to a second device; and performing a task among a plurality of tasks relating to an operation of an application executed by the second device and the characteristic information.

The 3D location information of the hovering input may be determined based on a distance between a hovering inputter and the first device, and wherein the characteristic information of the hovering input may further include movement information of the hovering inputter.

The plurality of tasks may be identified by performing a second operation relating to a first operation of the application executed by the second device.

According to an aspect of another exemplary embodiment, there is provided a device including: an input interface configured to receive a hovering input; a controller configured to: determine a distance between the device and a hovering inputter, determining 3-dimensional (3D) location information of a hovering input based on the distance and select a task among a plurality of tasks corresponding to an operation of an application executed by the device and 3-dimensional (3D) location information of the hovering input; and determine a class of an execution input according to the hovering input; and an output interface configured to perform the selected task according to the determined class of the execution input.

The controller may be further configured to determine an object, among one or more objects indicating the plurality of tasks, corresponding to a location of a hovering inputter, and output the determined object, wherein the task may be selected according to the determined object and the 3D location information of the hovering input.

The controller may be further configured to select a task among the plurality of tasks indicated by the determined object, and determine a multiplier of the selected task by using the 3D location information of the hovering input, wherein the output interface may be further configured to perform the selected task according to the determined multiplier.

The plurality of tasks may be identified according to a second operation corresponding to a first operation of the application executed by the device.

When the application is executed, the controller may be further configured to select at least one application among a plurality of applications indicated by at least one object output by the device, based on the 3D location information of the hovering input.

The controller may be further configured to receive information regarding a moving direction of a hovering inputter, select a task corresponding to the moving direction of the hovering inputter, and perform the selected task based on the 3D location information of the hovering input.

The controller may be further configured to determine a class of the hovering input based on a moving pattern of a hovering inputter, select a task corresponding to the class of the hovering input, and perform the one task based on the 3D location information of the hovering input.

The controller may be further configured to determine whether the hovering input corresponds to the execution input based on previously stored database of the application, wherein when the execution input corresponding to the hovering input is received, the output interface may be further configured to perform the selected task.

According to an aspect of another exemplary embodiment, there is provided a device including: a first device configured to determine characteristic information including 3-dimensional (3D) location information of a hovering input received by a first device; and a second device configured to receive the characteristic information from the first device and perform a task among a plurality of tasks relating to an operation of an executed application and the characteristic information.

The 3D location information of the hovering input may be determined based on a distance between a hovering inputter and the first device, and wherein the characteristic information of the hovering input may further include movement information of the hovering inputter.

The plurality of tasks may be identified according to a second operation corresponding to a first operation of the application executed by the second device.

According to an aspect of another exemplary embodiment, there is provided a display device including: a sensor configured to detect a user input; a display configured to display at least one object; a controller configured to perform an operation of an application corresponding to the object that is nearest to the detected user input, wherein the operation performed is based on a distance from the user input to the display.

In response to the application being a music player and the operation being a fast forward operation, the fast forward operation may be performed at a speed corresponding to the distance from the user input to the display.

The operation performed may be based on a movement of the user input.

BRIEF DESCRIPTION OF THE DRAWINGS

These and/or other aspects will become apparent and more readily appreciated from the following description of one or more exemplary embodiments, taken in conjunction with the accompanying drawings in which:

FIGS. 6A through 6C are diagrams illustrating a method in which a device selects one of a plurality of tasks relating to a diary application based on a type of a hovering input when the diary application is executed, according to an exemplary embodiment;

FIGS. 13A and 13B are diagrams illustrating a method in which a device performs at least one of a plurality of tasks based on a movement of a hovering input unit and 3D location information of a hovering input according to an exemplary embodiment;

FIGS. 20A and 20B are diagrams illustrating a method in which a system for controlling a device controls a first device and a second device according to another exemplary embodiment;

DETAILED DESCRIPTION

Figure 1:
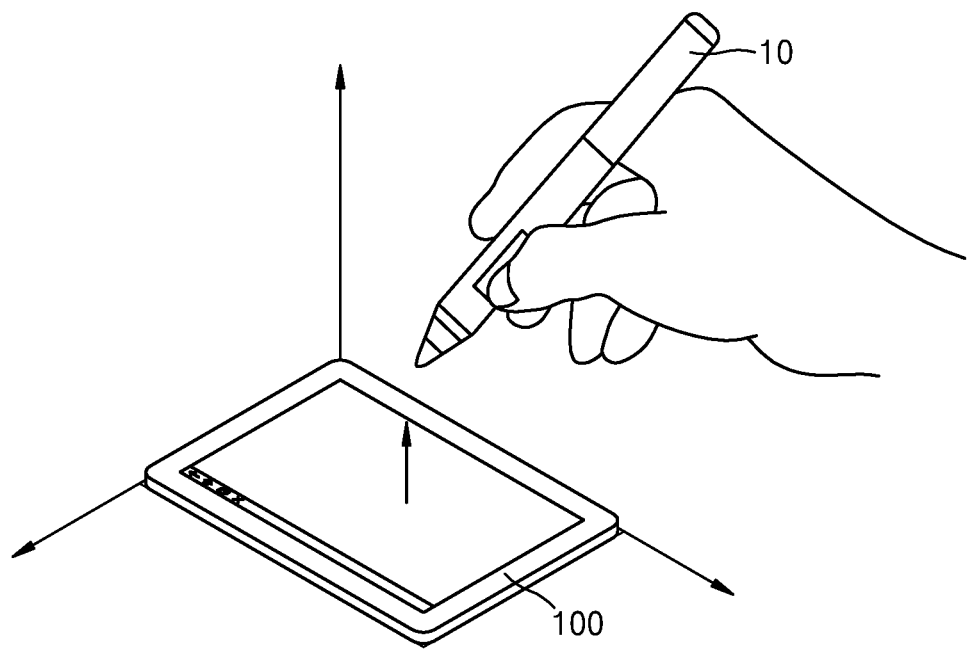
FIG. 1 is a diagram illustrating a device control method according to an exemplary embodiment.

Reference will now be made in detail to one or more exemplary embodiments, examples of which are illustrated in the accompanying drawings, wherein like reference numerals refer to like elements throughout. Exemplary embodiments may have different forms and should not be construed as being limited to the descriptions set forth herein. Accordingly, the exemplary embodiments are described below, by referring to the figures, to explain aspects of the present disclosure. As used herein, expressions such as "at least one of," when preceding a list of elements, modify the entire list of elements and do not modify the individual elements of the list.

Terms used herein will be briefly described, and exemplary embodiments will be described in detail below.

Terms employed herein may vary according to an intention of one of ordinary skill in the art, a precedent, or emergence of new technologies. It will be understood that the terms used herein should be interpreted as having a meaning that is consistent with their meaning in the context of the relevant art and should not be interpreted in an idealized or overly formal sense unless expressly stated.

It should be further understood that the terms "comprises," "comprising," "includes," and/or "including," when used herein, specify the presence of components, but do not preclude the presence or addition of one or more other components, unless otherwise specified. Additionally, terms used herein, such as 'unit' or 'module,' signify entities for processing at least one function or operation. These entities may be implemented by hardware, software, or a combination of hardware and software.

FIG. 1 is a diagram illustrating a device control method according to an exemplary embodiment.

A device 100 may obtain a hovering input 10 while executing an application. Throughout the present disclosure, the term "application" may refer to a set of a series of computer programs for performing a task. One or more exemplary embodiments may include various applications. For example, applications may include a music player application, a game application, a video player application, a map application, a memo application, a diary application, a phone book application, a broadcasting application, a fitness aid application, a payment application, and a picture folder application, etc. However, applications are not limited to these.

The device 100 may obtain a hovering input from a user. The hovering input indicates an input method of locating a hovering input unit 10 (for example, an electronic pen or a finger) within a predetermined distance of the device 100, changing a capacitance detected by the device 100, and transferring an instruction for performing an operation intended by the user to the device 100. A type of the hovering input may be determined based on a distance between the device 100 and the hovering input unit 10 that generates the hovering input. The type of the hovering input may also be generated based on at least one of a moving pattern and a moving direction of the hovering input unit 10.

For example, the device 100 may determine a first hovering input having a first depth (i.e., the distance between the device 100 and the hovering input unit 10) and a second hovering input having a second depth (i.e., the distance between the device 100 and the hovering input unit 10), as different types (e.g., classes) of hovering inputs. The device 100 may also determine a third hovering input (e.g., when the hovering input unit 10 moves clockwise) and a fourth hovering input (e.g., when the hovering input unit 10 moves counterclockwise), as different types of hovering inputs. The device 100 may also determine a fifth hovering input (e.g., when the hovering input unit 10 moves in a circular shape) and a sixth hovering input (e.g., when the hovering input unit 10 moves in a rectangular shape), as different types of hovering inputs.

The device 100 may obtain metadata regarding the application being executed by the device 100 at the time the hovering input is obtained. For example, the device 100 may obtain information regarding content displayed by the application being executed and information regarding an object displayed by the application. When the application is executed, the content may be multimedia including at least one of texts, images, and moving pictures that may be provided by the device 100. When the application is executed, the object may be an identification mark that is output to control the application so that the user may receive desired content, and may include an icon, etc. According to another example, the metadata regarding the application may include information regarding at least one task that may be performed when the application is executed, and information regarding a relationship between the at least one task and an obtained user input, etc. For example, the metadata regarding the application may include a task that deletes a photo when a photo storing application is executed, an identification value that may identify a task that edits the photo, information regarding a task corresponding to an obtained user hovering input, etc.

The task may include another application relating to an operation of the executed application or another operation that may be performed in association with the operation of the executed application. In this regard, the operation may be distinguished according to a function that may be performed by the device 100. For example, when the video player application is executed, the device 100 may perform a first operation that performs a function to play a video, and a second operation that performs a function to stop playing the video, etc.

When the device 100 executes the video player application, the task may include a video editing application relating to the video player application. According to another example, the task may include a video stop operation that may be performed in association with an operation of playing a video of the video player application being executed.

A plurality of tasks may be identified according to a performing unit (e.g., multiplier) used to perform one operation relating to the operation of the application being executed by the device 100. An operation performing accuracy may be determined according to the performing unit. For example, when the user explores a specific frame in the video player application, a unit of the explored frame may differ according to the performing unit. For example, the device 100 may explore a play section in ten frame units or in one frame unit. This will be described in more detail with reference to FIGS. 15 and 16 later.

The device 100 according to an exemplary embodiment may obtain a user input of various types. For example, the device 100 may obtain the hovering input. According to another example, the device 100 may obtain a touch input. The device 100 may also obtain a signal generated when the user clicks a button of the hovering input unit 10.

The device 100 according to an exemplary embodiment may be realized in various types. For example, the device 100 described in the present disclosure may include a cellular phone, a smart phone, a laptop computer, tablet PC, an e-book reader, a digital broadcasting equipment, a navigation system, an MP3 player, and a digital camera, etc. However, it is not limited to these.

Figure 2:
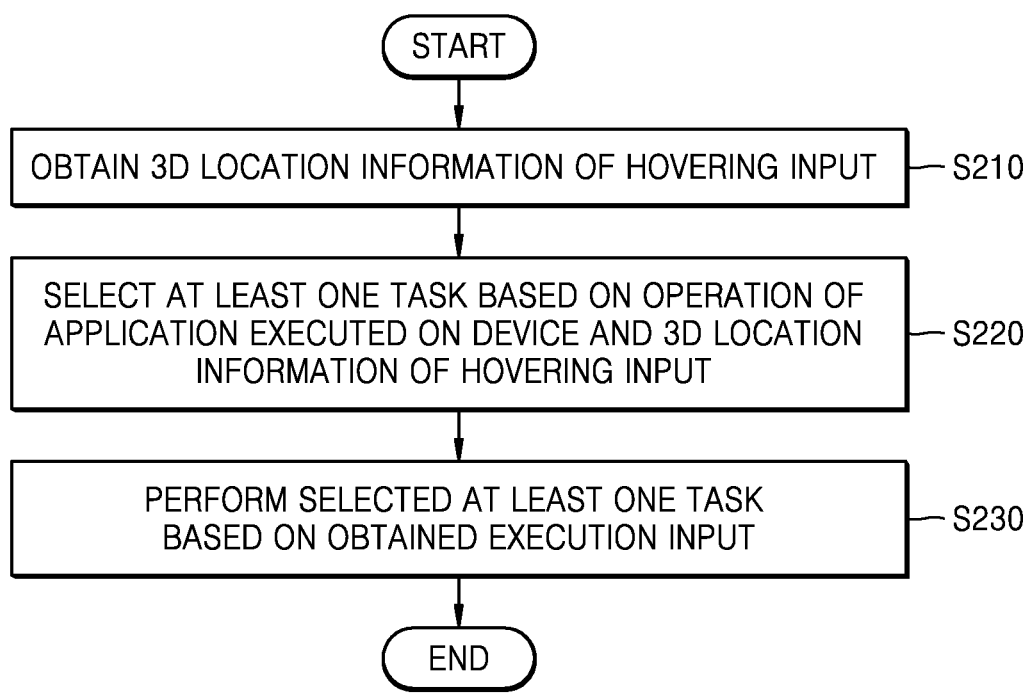
FIG. 2 is a flowchart of a device control method according to an exemplary embodiment.

FIG. 2 is a flowchart of a device control method according to an exemplary embodiment.

In operation S210, the device 100 may obtain 3-dimensional (3D) location information of an obtained hovering input. The hover input may be generated by the hovering input unit 10 located within a predetermined distance from the device 100. The 3D location information of the hovering input may be determined based on a distance between the device 100 and the hovering input unit 10.

In operation S220, the device 100 may select at least one of a plurality of tasks relating to an operation of an application executed by the device 100 and an operation of the application based on the 3D location information of the obtained hovering input.

The device 100 may obtain information regarding an operation of the application at the time the hovering input is obtained. For example, when a video player application is executed, the device 100 may obtain information regarding whether the application has played a video or has stopped playing the video. For another example, in the case of a menu application, the device 100 may obtain information regarding whether the menu application has displayed information regarding other applications or has not displayed the information regarding other applications due to a lock state.

The device 100 may determine a type of the hovering input. The device 100 may determine the type of the hovering input based on the distance between the device 100 and the hovering input unit 10. However, this is merely an example. The device 100 may determine the type of the hovering input generated by the hovering input unit 10 based on at least one of a moving direction and a moving pattern of the hovering input unit 10. The device 100 may determine a task corresponding to the determined type of the hovering input among the plurality of tasks relating to the operation of the application at the time the hovering input is obtained. For example, the device 100 may obtain a first hovering input having a first depth (i.e., the distance between the device 100 and the hovering input unit 10), and, when a video player application plays a video at the time the hovering input is obtained, the device may select a task that stops playing the video corresponding to the first hovering input based on metadata of the video player application.

In operation S230, the device 100 may obtain a preset type of an execution input according to the hovering input and perform the selected at least one task.

The device 100 may obtain the execution input requesting performing of the selected task after obtaining the hovering input. Metadata of the application executed by the device 100 may store information regarding the type of the execution input corresponding to the obtained hovering input. The device 100 may determine whether the obtained execution input corresponds to a previously obtained hovering input using the metadata of the application.

The device 100 may determine that the hovering input is not valid when the execution input is not obtained within a threshold time unit (e.g., predetermined time) after obtaining the hovering input. For example, if the execution input is not obtained within 2 seconds after obtaining the hovering input, the device 100 may determine that the hovering input is not valid.

The device 100 may perform the selected at least one task based on the obtained execution input. For example, when the video player application is executed, if the task that stops playing the video is selected, and an execution input generated by moving the hovering input unit 10 to the right is obtained, the device 100 may perform the task that stops playing the video. However, this is merely an example of the execution input and the present disclosure is not limited thereto.

Figure 3:
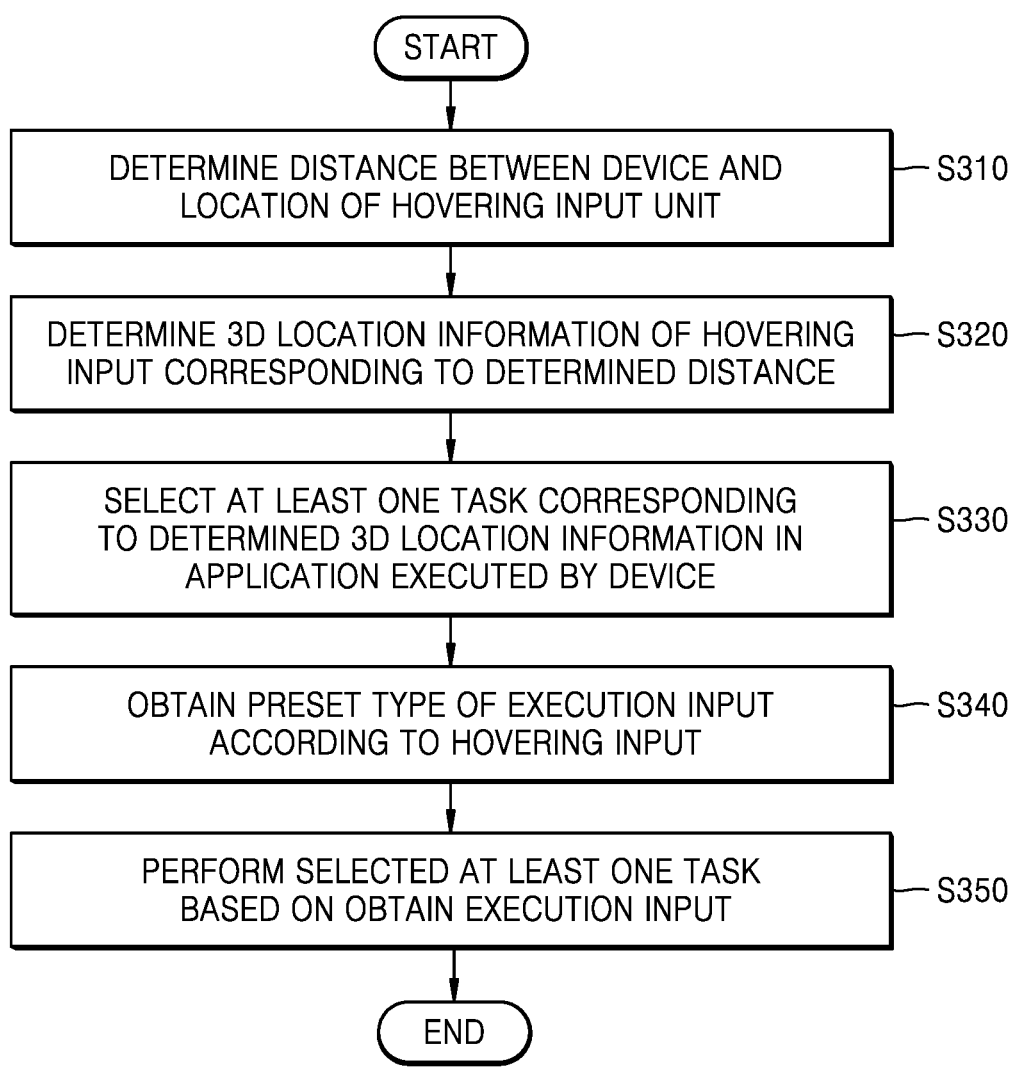
FIG. 3 is a flowchart of a device control method based on 3D location information of a hovering input obtained by a device according to an exemplary embodiment.

FIG. 3 is a flowchart of a device control method based on 3D location information of a hovering input obtained by the device 100 according to an exemplary embodiment.

In operation S310, the device 100 may obtain information regarding a distance between the hovering input unit 10 that generates the hovering input and the device 100. The device 100, according to an exemplary embodiment, may measure a capacitance that varies according to the obtained hovering input and obtain the information regarding the distance between the hovering input unit 10 and the device 100.

In operation S320, the device 100 may obtain the 3D location information of the hovering input based on the obtained information regarding the distance between the hovering input unit 10 and the device 100. The device 100 may convert the obtained information regarding the distance into the 3D location information based on a preset reference surface. A method in which the device 100 converts the obtained information regarding the distance into the 3D location information may be a general coordinate conversion method, etc. However, the method of converting the obtained information regarding the distance into the 3D location information is not limited to a coordinate conversion method.

In operation S330, the device 100 may select at least one task based on a type of the hovering input determined according to the 3D location information of the hovering input.

The device 100 may determine the type of the hovering input based on the 3D location information. For example, the device 100 may determine a first hovering input having a first depth (i.e., the distance between the device 100 and the hovering input unit 10) and a second hovering input having a second depth (i.e., the distance between the device 100 and the hovering input unit 10), as different types of hovering inputs.

The device 100 may select at least one task corresponding to the determined type of the hovering input based on an operation of an executed application. The device 100 may store metadata of an application including information regarding the task corresponding to the determined type of the hovering input in the executed application. The device 100 may select the task corresponding to the determined type of the hovering input using the metadata of the application.

In operation S340, the device 100 may obtain a preset type of the execution input according to the hovering input. The device 100 may obtain the execution input requesting performance of the selected task after obtaining the hovering input. The device 100 may perform the selected at least one task when obtaining the execution input corresponding to the hovering input (S350).

Figure 4:
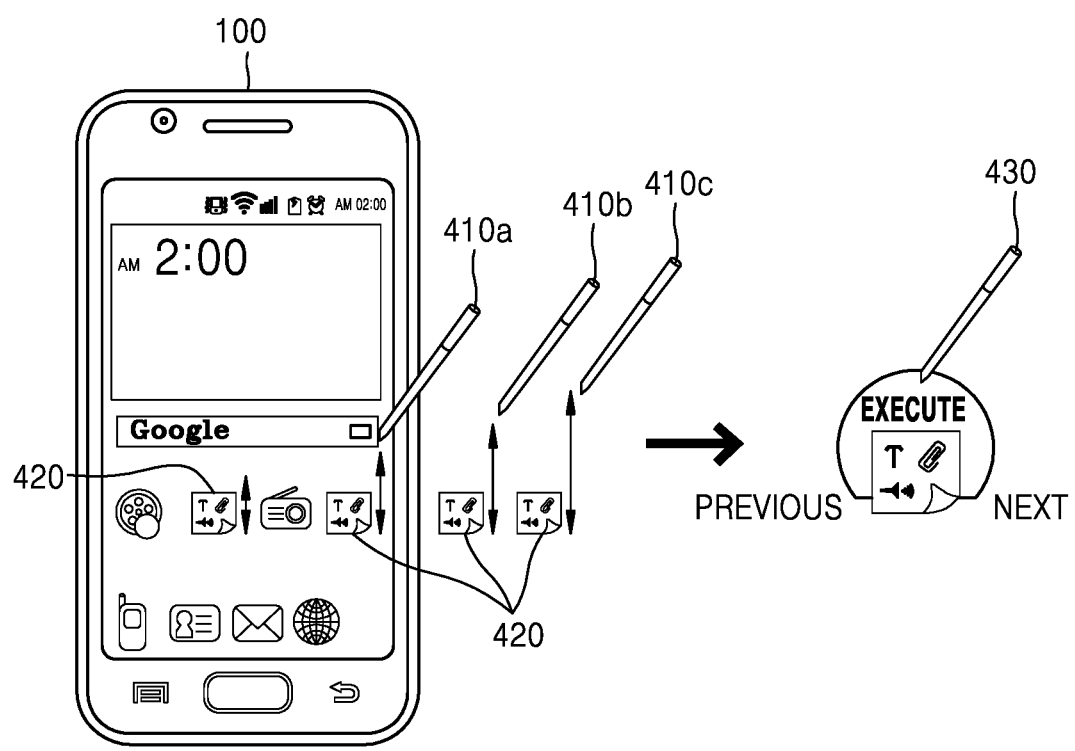
FIG. 4 is a diagram illustrating a method of selecting one of a plurality of tasks based on 3D location information of a hovering input obtained by a device according to an exemplary embodiment.

FIG. 4 is a diagram illustrating a method of selecting one of a plurality of tasks based on 3D location information of a hovering input obtained by the device 100, according to an exemplary embodiment.

Referring to FIG. 4, when the device 100 executes a menu application, a plurality of objects indicating a plurality of applications that may be executed by the device 100 may be displayed on a screen of the device 100. For convenience of description, an icon will be described below as an example of an object. However, this is merely an example and an object may include other various types of identification marks indicating the plurality of applications in addition to an icon.

For example, an icon indicating a message application, an icon indicating a contact number application, an icon indicating a call application, etc., may be displayed. A user may request the device 100 to execute an application indicated by an icon by selecting the icon displayed on the device 100.

The plurality of icons displayed on the device 100 may include a united icon 420 indicating the plurality of applications among the plurality of icons displayed on the device 100. The user may select the united icon 420 to execute at least one of the plurality of applications indicated by the united icon 420. The user may select the united icon 420 by holding the hovering input unit 10 at a location corresponding to the united icon 420.

The device 100 may determine whether a hovering input unit 410a, 410b, or 410c, that generates the hovering input is held at the location corresponding to the united icon 420. In this regard, holding refers to a stop operation performed for a predetermined period of time with regard to the device 100 in which the hovering input does not contact the device 100 within a predetermined distance range. In this regard, information regarding whether the hovering input unit 10 is held at the location corresponding to the united icon 420 may be determined by determining whether a difference between 2D location information of the hovering input unit 410a, 410b, or 410c, and 2D location information of the united icon 420 is smaller than a threshold value with respect to the device 100. When the difference between 2D location information of the hovering input unit 410a, 410b, or 410c, and 2D location information of the united icon 420 is smaller than the threshold value, the device 100 may determine that the hovering input may be obtained at the location corresponding to the united icon 420.

For example, when a point at which two side surfaces of the device 100 cross each other is set as a reference point, and a difference between an x and y coordinate of the united icon 420 on a 2D plane based on the reference point and an x and y coordinate of the hovering input unit 410a, 410b, or 410c, based on the reference point is smaller than the threshold value, the device 100 may determine that the hovering input unit 410a, 410b, or 410c, that generates the hovering input is held at the location corresponding to the united icon 420.

The device 100 may select at least one of the plurality of applications indicating the united icon 420 according to the 3D location information of the hovering input. In this regard, the 3D location information of the hovering input may be determined according to a distance between the device 100 and the hovering input unit 410a, 410b, or 410c, at the time the hovering input is obtained. For example, when the 3D location information of the device 100 is set as 0, if the hovering input unit 410a at the time the hovering input is obtained is located at a point having a distance z from the device 100, the 3D location information of the device 100 may be set as z.

The device 100, according to an exemplary embodiment, may select different applications when the 3D location information of the hovering input is different than z, e.g., z1 and z2. For example, the plurality of applications indicated by the united icon 420 may include a photo folder application, a camera application, and a photo editing application. When the hovering input having z1 as the 3D location information is obtained, the device 100 may select the photo folder application. When the hovering input having z2 as the 3D location information is obtained, the device 100 may select the camera application. When the hovering input having z3 as the 3D location information is obtained, the device 100 may select the photo editing application.

As illustrated by hovering input unit 430, the executing an application may be initiated by performing an operation, e.g., a gesture, at a distance from device 100. However, the present disclosure is not limited to this.

Figure 5A:
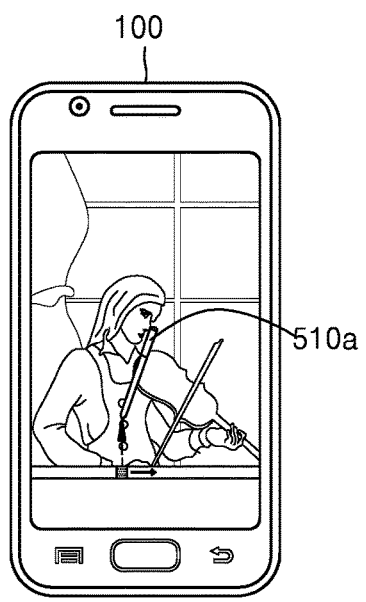
FIGS. 5A through 5C are diagrams illustrating a method in which a device selects one of a plurality of tasks based on 3D location information of a hovering input, according to an exemplary embodiment.
Figure 5B:
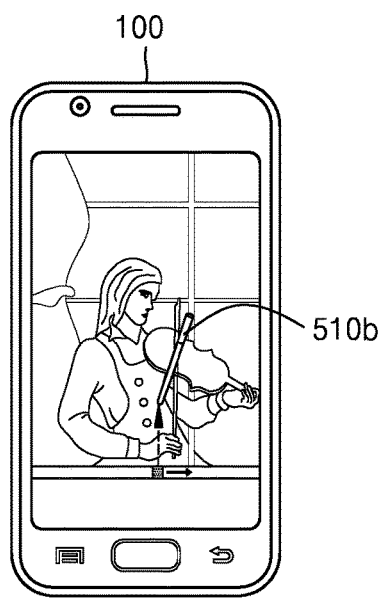
Figure 5C:
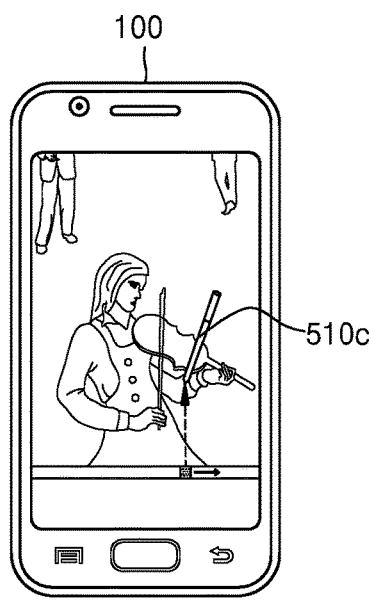

FIGS. 5A through 5C are diagrams illustrating a method in which the device 100 selects one of a plurality of tasks based on 3D location information of a hovering input according to another exemplary embodiment.

When the hovering input is obtained, the device 100 may select and perform at least one of the plurality of tasks relating to a first operation of an application executed by the device 100. In this regard, the plurality of tasks may be identified using a method of performing a second operation relating to the first operation of the application executed by the device 100.

For example, referring to FIGS. 5A through 5C, when a video player application is executed, at last one frame constituting a video may be output on a screen of the device 100. The device 100 may obtain a first hovering input having a distance z1 between the device 100 and a hovering input unit 510a while performing the first operation of playing the video. The device 100 may select an operation of fast-forwarding the video corresponding to the first hovering input based on metadata of the video player application. For example, a user may transmit the first hovering input by holding the hovering input unit 510a on a progress bar that is output on the screen of the device 100 more than a preset period of time in the distance z1 between the device 100 and the hovering input unit 510a while the video is played.

The device 100 may obtain a second hovering input having a distance z2 between the device 100 and the hovering input unit 510b while performing the first operation of playing the video. The device 100 may select an operation of stopping playing the video corresponding to the second hovering input based on the metadata of the video player application. For example, the user may transmit the second hovering input by holding the hovering input unit 510b on the progress bar that is output on the screen of the device 100 more than the preset period of time in the distance z2 between the device 100 and the hovering input unit 510*b* while the video is played.

The device 100 may obtain a third hovering input having a distance z3 between the device 100 and the hovering input unit 510*c* while performing the first operation of playing the video. The device 100 may select an operation of rewinding the video corresponding to the third hovering input based on the metadata of the video player application. For example, the user may transmit the third hovering input by holding the hovering input unit 510*c* on the progress bar that is output on the screen of the device 100 more than the preset period of time in the distance z2 between the device 100 and the hovering input unit 510*b* while the video is played.

FIGS. 6A through 6C are diagrams illustrating a method in which the device 100 selects one of a plurality of tasks relating to a diary application based on a type of a hovering input when the diary application is executed according to an exemplary embodiment.

Referring to FIGS. 6A through 6C, when the diary application is executed, a screen of the device 100 may output content related to today's schedule. The device 100 may obtain the hovering input that requests a second operation of turning over pages while performing a first operation of outputting a first page related to today's schedule. For example, a user may transmit the hovering input that requests the second operation of turning over pages to the device 100 by holding a hovering input unit 610 (610*a*, 610*b*, 610*c*) on one side surface of the screen of the device 100 that outputs the first page after a preset period of time.

The device 100 may select a method of performing the second operation of turning over pages based on 3D location information of the hovering input. For example, the device 100 may select a unit of turning over pages based on the 3D location information. Referring to FIG. 6A, when the 3D location information of the hovering input is z1 (610*a*), the device 100 may select the second operation of turning over pages based on a daily unit. Referring to FIG. 6B, when the 3D location information of the hovering input is z2 (610*b*), the device 100 may select the second operation of turning over pages based on a weekly unit. Referring to FIG. 6C, when the 3D location information of the hovering input is z3 (610*c*), the device 100 may select the second operation of turning over pages based on a monthly unit.

According to another exemplary embodiment, when the operation of turning over pages is performed based on the 3D location information of the hovering input, the number of turned pages may be determined. For example, when the operation of turning over pages is performed, the device 100 may select the method of performing the second operation so that the greater the value of the 3D location information of the hovering input, the more the number of turned pages.

According to another exemplary embodiment, the device 100 may determine the method of performing the second operation of turning over pages based on a moving direction of the hovering input unit 610 (610*a*, 610*b*, 610*c*) that generates the hovering input. The device 100 may determine a direction of turning pages based on the moving direction of the hovering input unit 610 (610*a*, 610*b*, 610*c*) that generates the hovering input. For example, when the hovering input unit 610 (610*a*, 610*b*, 610*c*) moves to the right, the device 100 may select the second operation of turning to pages after a currently displayed page. As another example, when the hovering input unit 610 (610*a*, 610*b*, 610*c*) moves to the left, the device 100 may select the second operation of turning to pages before the currently displayed page.

Figure 7A:
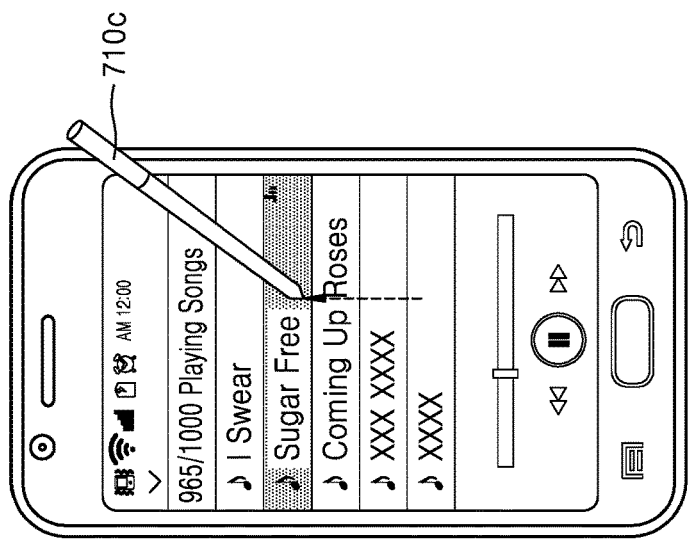
FIGS. 7A through 7C are diagrams illustrating a method in which a device selects one of a plurality of tasks relating to a music play application based on a type of a hovering input when the music play application is executed, according to an exemplary embodiment.
Figure 7B:
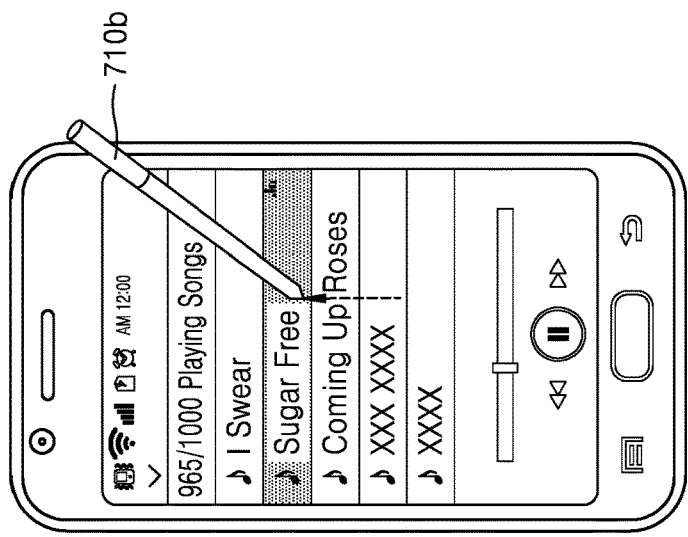
Figure 7C:
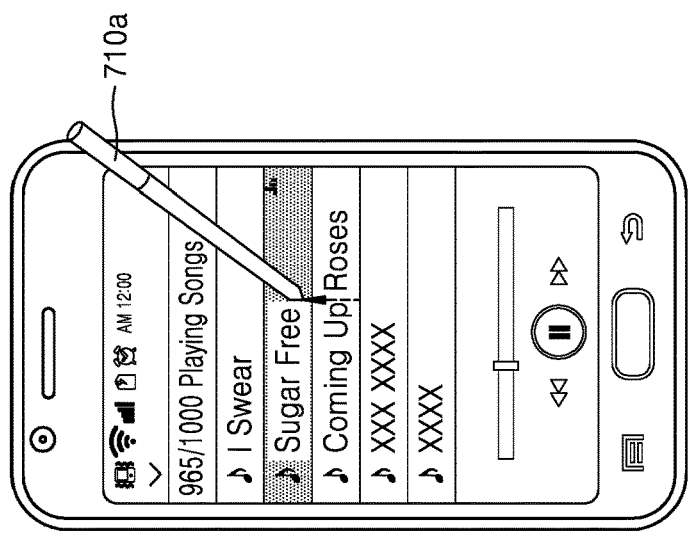

FIGS. 7A through 7C are diagrams illustrating a method in which the device 100 selects one of a plurality of tasks relating to a music play application based on a type of a hovering input when the music play application is executed according to another exemplary embodiment.

Referring to FIGS. 7A through 7C, when the music play application is executed, information of music that is currently being played may be displayed on a screen of the device 100. For example, information that the music that is currently being played is a fourth song on an album A may be displayed on the device 100. The device 100 may obtain a hovering input that requests a second operation of changing the music that is currently being played to music included in another list while performing a first operation of playing the music. For example, a user may transmit the hovering input that requests the second operation of changing the music that is currently being played by holding a hovering input unit 710 (710*a*, 710*b*, 710*c*) on one side surface of the screen of the device 100 that displays the information about the music that is currently played more than a preset period of time.

The device 100 may select a method of performing the second operation of changing the music that is currently being played to the music included in another list based on 3D location information of the hovering input. For example, the device 100 may determine a category including music that is to be changed based on the 3D location information of the hovering input. Referring to FIG. 7A, when the 3D location information of the hovering input is z1, the device 100 may select the second operation of changing the music that is currently being played to another piece of music in the album A. Referring to FIG. 7B, when the 3D location information of the hovering input is z2, the device 100 may select the second operation of changing the music that is currently being played to music included in another album. Referring to FIG. 7C, when the 3D location information of the hovering input is z3, the device 100 may select the second operation of changing the music that is currently being played to music included in an album stored in another folder.

According to another exemplary embodiment, the device 100 may determine a direction of the second operation of changing music based on a moving direction of the hovering input unit 710 (710*a*, 710*b*, 710*c*). For example, the device 100 may determine whether to change the music that is being played to music right before or after the music that is currently played according to the moving direction of the hovering input unit 710 (710*a*, 710*b*, 710*c*). For example, when the hovering input unit 710 (710*a*, 710*b*, 710*c*) moves right, the device 100 may change the song that is currently being played to the next song. When the hovering input unit 710 (710*a*, 710*b*, 710*c*) moves left, the device 100 may change the music that is currently being played to the music preceding the music that is currently being played.

Figure 8A:
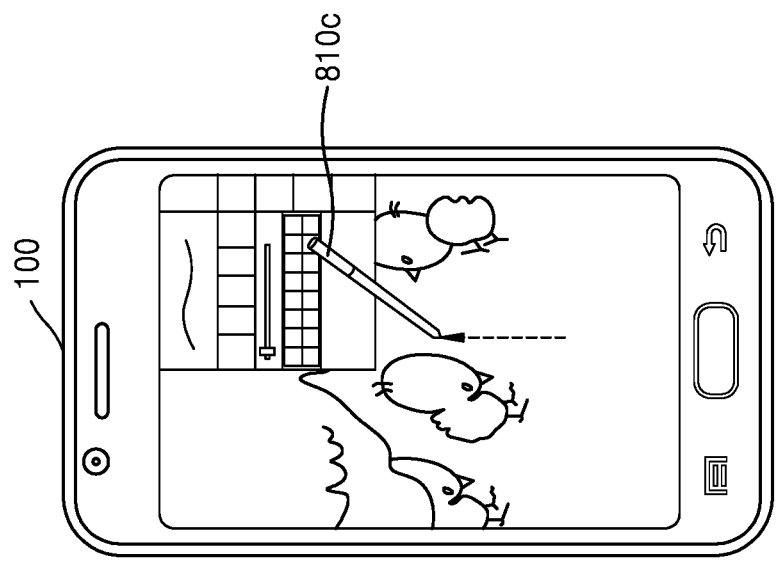
FIGS. 8A through 8C are diagrams illustrating a method in which a device selects one of a plurality of tasks relating to a drawing board application based on a type of a hovering input when the drawing board application is executed, according to an exemplary embodiment.
Figure 8B:
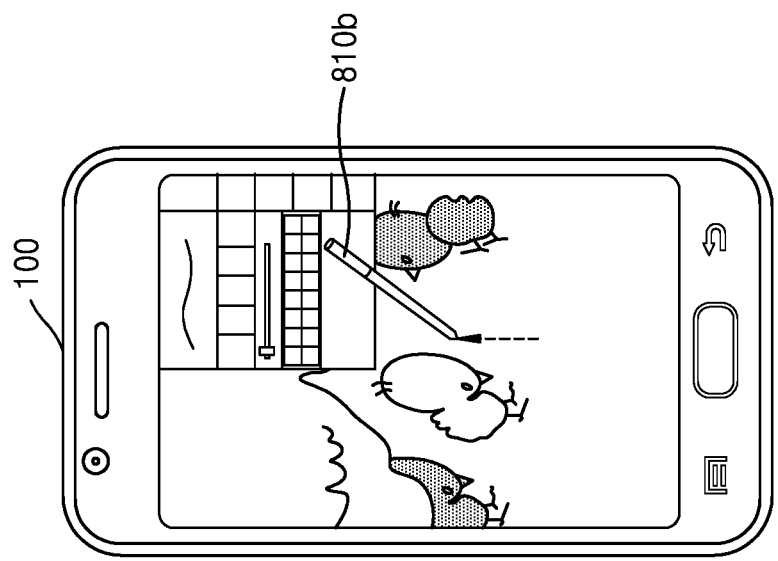
Figure 8C:
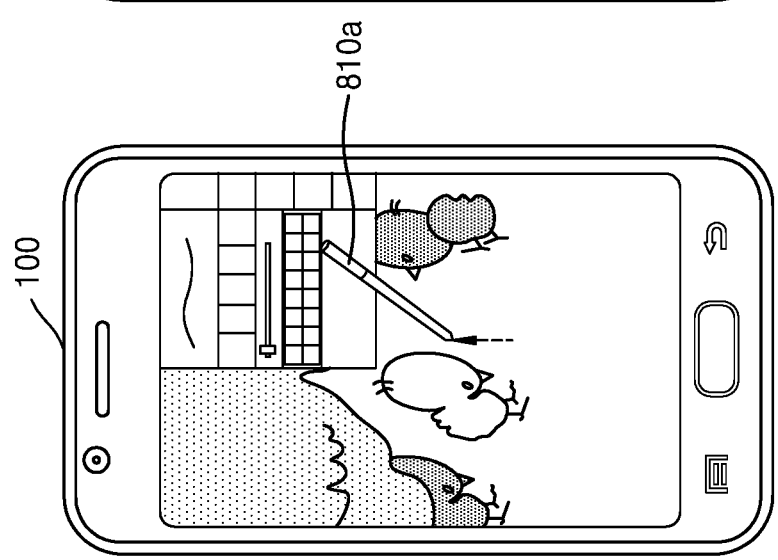

FIGS. 8A through 8C are diagrams illustrating a method in which the device 100 selects one of a plurality of tasks relating to a drawing board application based on a type of the hovering input 10 when the drawing board application is executed according to another exemplary embodiment.

The device 100 may perform a task of canceling an operation performed by the device 100 based on 3D location information of the obtained hovering input 10.

Referring to FIGS. 8A through 8C, when the drawing board application is executed, a currently colored image may be output on a screen of the device 100. The device 100 may obtain the hovering input that requests a second operation of canceling coloring of the image while performing a first operation of coloring the image. For example, a user may transmit the hovering input that requests the second operation of canceling a coloring job performed on the device 100 by holding a hovering input unit 810 (810*a*, 810*b*, 810*c*) on one side surface of the device 100 that displays the image currently being colored by the user more than a preset period of time.

The device 100 may determine a method of performing the second operation of canceling the performed coloring job (e.g., drawing application) based on the 3D location information of the hovering input. For example, the device 100 may determine a range of the canceled coloring job based on the 3D location information of the hovering input. For example, referring to FIG. 8A, when the 3D location information of the hovering input is z1 (810*a*), the device 100 may select the second operation of canceling a coloring job performed right before obtaining the hovering input. Referring to FIG. 8B, when the 3D location information of the hovering input is z2 (810*b*), the device 100 may select the second operation of canceling coloring jobs of five times among coloring jobs performed right before obtaining the hovering input. Referring to FIG. 8C, when the 3D location information of the hovering input is z3 (810*c*), the device 100 may select the second operation of canceling all performed coloring jobs.

Figures 9A, 9B, 9C:
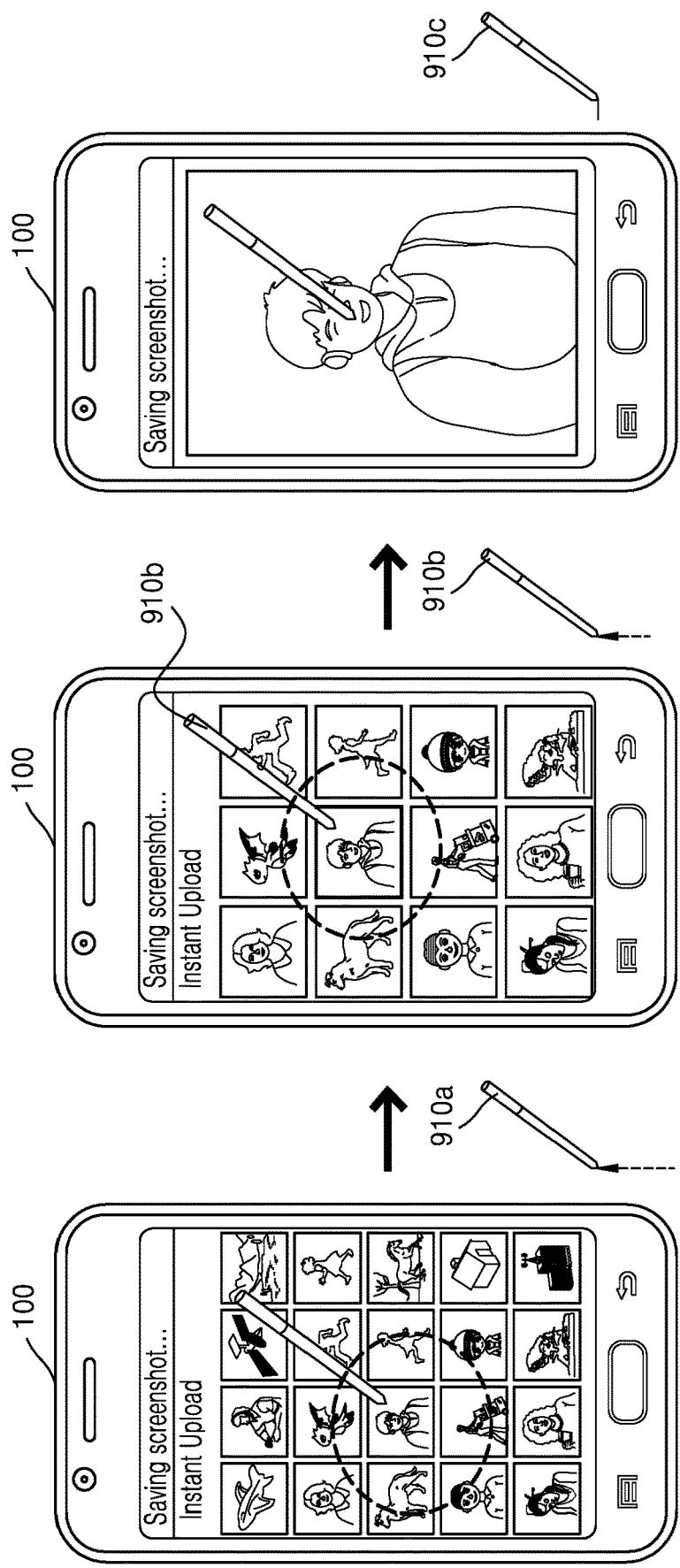
FIGS. 9A through 9C are diagrams illustrating a method in which a device selects one of a plurality of tasks relating to a photo folder application based on a type of a hovering input when the photo folder application is executed, according to an exemplary embodiment.

FIGS. 9A through 9C are diagrams illustrating a method in which the device 100 selects one of a plurality of tasks relating to a photo folder application based on a type of a hovering input when the photo folder application is executed according to an exemplary embodiment.

Referring to FIGS. 9A through 9C, when the photo folder application is executed, at least one photo stored in a memory relating to the photo folder application may be displayed on a screen of the device 100. The device 100 may obtain the hovering input that requests a second operation of selecting a photo while performing a first operation of displaying the photo. For example, a user may transmit the second operation of selecting the photo to the device 100 by holding a hovering input unit 910 (910*a*, 910*b*, 910*c*) on one side surface of the device 100 that displays the photo more than a preset period of time.

The device 100 may select a method of performing the second operation of selecting the photo based on 3D location information of the hovering input. For example, the device 100 may determine the number of selected photos based on the 3D location information of the hovering input. Referring to FIG. 9A, when the 3D location information of the hovering input is z1 (910*a*), the device 100 may select the second operation of selecting photos of a number corresponding to z1. Referring to FIG. 9B, when the 3D location information of the hovering input is z2 (910*b*), the device 100 may select the second operation of selecting photos of a number corresponding to z2. Referring to FIG. 9C, when the 3D location information of the hovering input is z3 (910*c*), the device 100 may select the second operation of selecting one photo displayed on a location corresponding to a location of the hovering input unit 910 (910*a*, 910 *b*, 910*c*).

The device 100 may select an image based on an obtained execution input based on the 3D location information of the hovering input. For example, when the hovering input unit 910 (910*a*, 910 *b*, 910*c*) stops at a specific height for longer than a preset period of time, the device 100 may determine that the execution input of selecting the image according to the determined unit is obtained.

According to another exemplary embodiment, the device 100 may determine a range of selected photos based on metadata information of photos based on the 3D location information of the hovering input. The metadata information of photos may include information regarding at least one of a photo capturing date, a photo capturing place, etc. For example, when the 3D location information of the hovering input is z4, the device 100 may select photos captured on dates within a week from the displayed date at the location corresponding to the location of the hovering input unit 910. When the 3D location information of the hovering input is z5, the device 100 may select photos captured on dates within a month from the displayed date at the location corresponding to the location of the hovering input unit 910.

Figure 10:
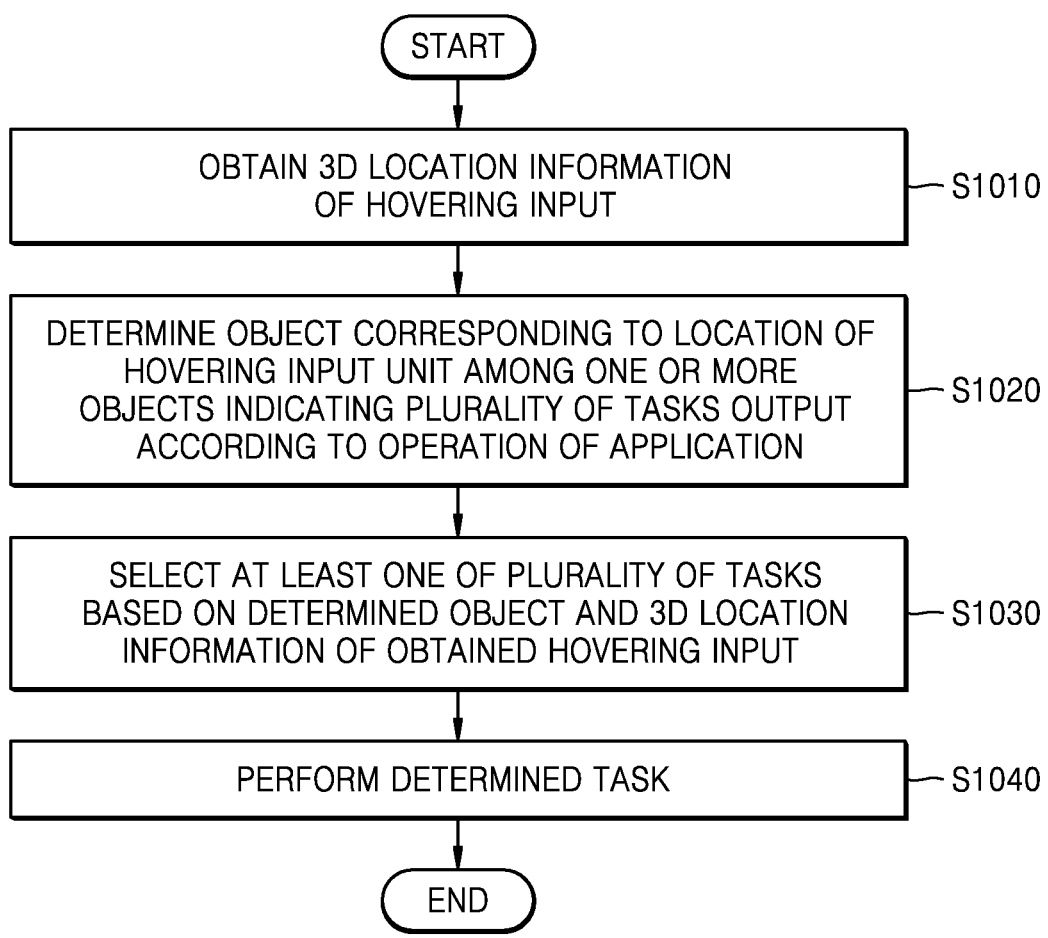
FIG. 10 is a flowchart of a device control method in which the device 100 controls another device based on a hovering input corresponding to one of objects output when an application is executed, according to an exemplary embodiment.

FIG. 10 is a flowchart of a device control method in which the device 100 controls another device based on the hovering input 10 corresponding to one of the objects output when an application is executed according to an exemplary embodiment.

In operation S1010, the device 100 may determine 3D location information of the obtained hovering input 10. In this regard, the 3D location information may be determined based on a distance between the device 100 and a hovering input unit.

In operation S1020, the device 100 may determine an object corresponding to a location of the hovering input unit among one or more objects indicating a plurality of tasks output according to an operation of the application. In this regard, the objects may include identification marks (for example, icons) indicating the plurality of tasks relating to the operation of the application. The plurality of tasks may include a plurality of operations relating to the operation of the application. For example, when a video player application performs an operation of playing a video, the plurality of tasks may include an operation of fast forwarding the video, an operation of pausing the video, an operation of recording the video, etc.

The device 100 may determine an object corresponding to a location of the hovering input unit among the one or more objects indicating the plurality of tasks by using location information of the hovering input unit. According to an exemplary embodiment, when a difference between 2D location information of the hovering input unit with respect to the device 100 and 2D location information of an object output by the device 100 is smaller than a threshold value, the device 100 may determine that the hovering input 10 is obtained at a location of the object. For example, when a point at which two side surfaces of the device 100 cross each other is set as a reference point, and a difference between an x and y coordinate of the object on a 2D plane based on the reference point and an x and y coordinate of the hovering input unit based on the reference point is smaller than the threshold value, the device 100 may determine that the hovering input 10 is obtained at the location of the object.

In operation S1030, the device 100 may select at least one of the plurality of tasks based on the determined object and 3D location information of the obtained hovering input 10. For example, the device 100 may select one of a plurality of second operations relating to a first operation performed by the device 100 based on the determined object. The device 100 may determine a method of performing the selected second operation based on the 3D location information of the obtained hovering input 10.

In operation S1040, the device 100 may perform the selected at least one task by obtaining an execution input. The device 100 may perform the selected task when obtaining the execution input corresponding to the hovering input 10.

Operation S1040 may correspond to operation S230 described above with reference to FIG. 2.

Figure 11A:
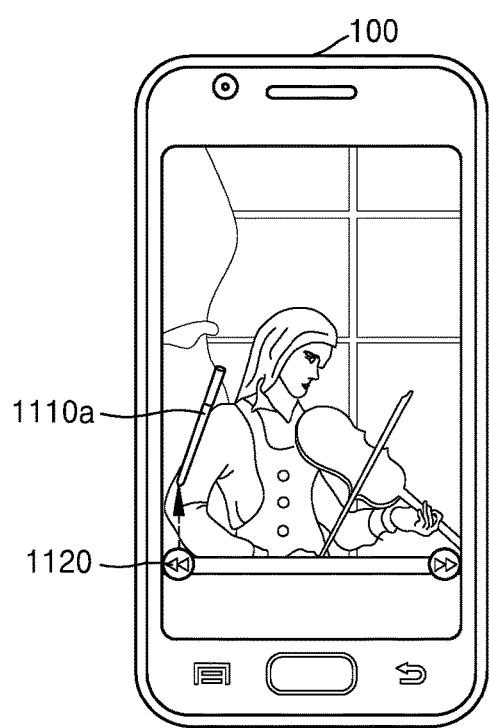
FIGS. 11A and 11B are diagrams illustrating a device control method in which a device controls another device based on a hovering input corresponding to one of objects output when an application is executed according to an exemplary embodiment.
Figure 11B:
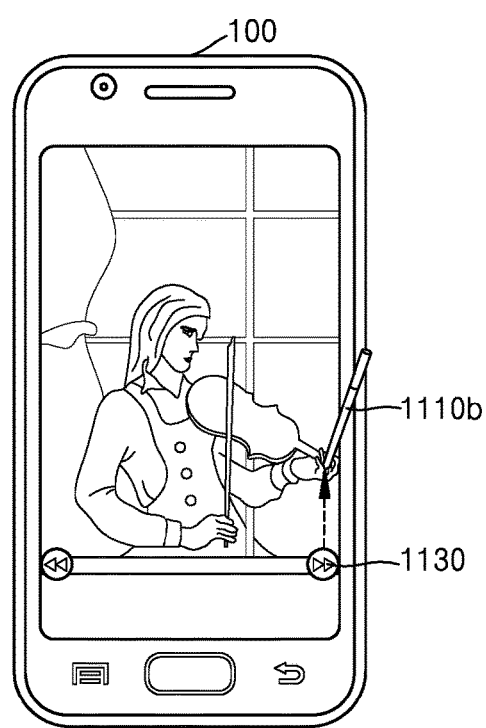

FIGS. 11A and 11B are diagrams illustrating a device control method in which the device 100 controls another device based on a hovering input corresponding to one of objects output when an application is executed according to an exemplary embodiment.

Referring to FIGS. 11A and 11B, the device 100 may execute a video player application. When the device 100 executes the video player application, icons 1120 and 1130 for changing a progress bar indicating information regarding a currently playing frame and the play frame may be displayed on a screen.

Referring to FIG. 11A, the device 100 may obtain a first hovering input corresponding to the first icon 1120 indicating a second operation of rewinding a video, among a plurality of operations relating to playing the video. A user may transmit the first hovering input to the device 100 by holding a hovering input unit 1110a at a location corresponding to a location of the first icon 1120. The device 100 may determine whether the location of the hovering input unit 1110a is present within a threshold distance from the location of the first icon 1120 on the device 100 and determine whether the first hovering input corresponds to the first icon 1120.

The device 100 may select a method of performing the second operation of rewinding the video based on 3D location information of the first hovering input. For example, when the 3D location information of the first hovering input is a, the device 100 may select the second operation of rewinding the video two times. When the 3D location information of the first hovering input is 2a, the device 100 may select the second operation of rewinding the video four times.

According to another exemplary embodiment, referring to FIG. 11B, the device 100 may obtain a second hovering input corresponding to a second icon 1130 indicating a second operation of fast-forwarding the video, among the plurality of operations relating to playing the video. The user may transmit the second hovering input to the device 100 by holding the hovering input unit 1110b at a location corresponding to a location of the second icon 1130. The device 100 may determine whether the location of the hovering input unit 1110b is present within a threshold distance from the location of the second icon 1130 on the device 100 and determine whether the second hovering input corresponds to the second icon 1130.

The device 100 may select a method of performing the second operation of fast-forwarding the video based on 3D location information of the second hovering input. For example, when the 3D location information of the first hovering input is a, the device 100 may select the second operation of fast-forwarding the video two times. When the 3D location information of the first hovering input is 2a, the device 100 may select the second operation of fast-forwarding the video four times.

Figure 12:
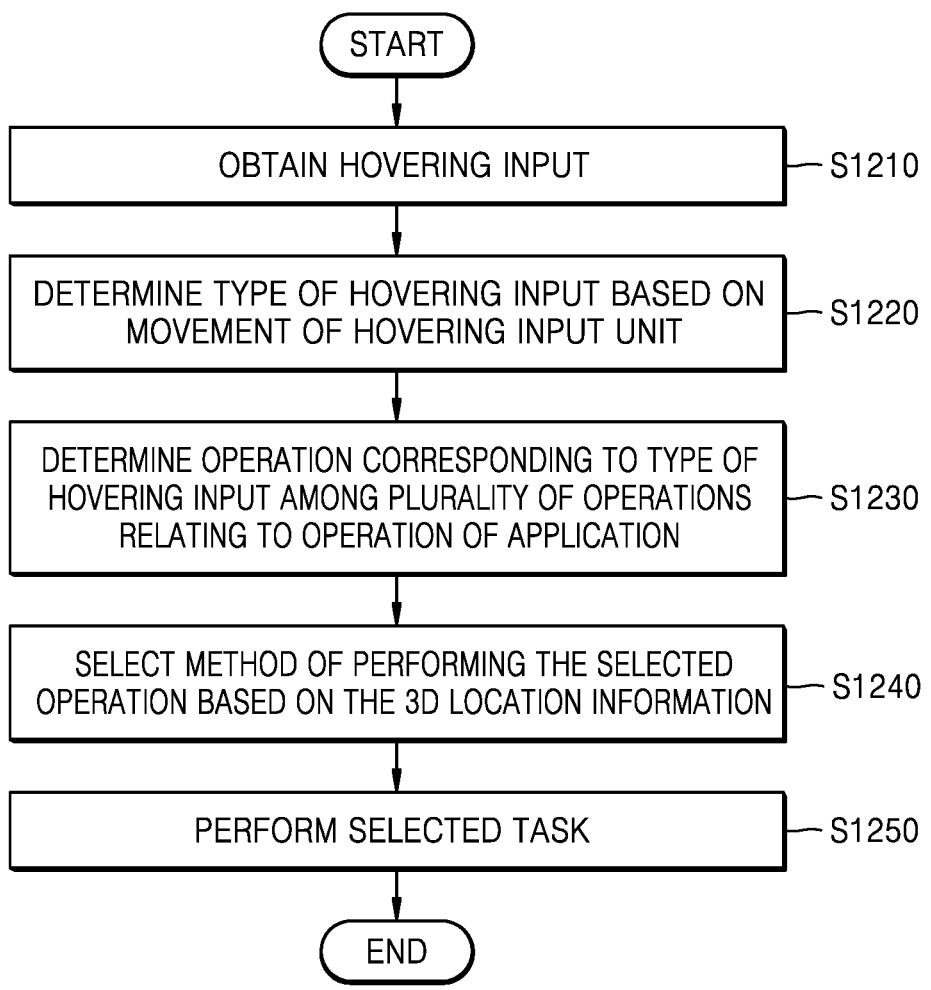
FIG. 12 is a flowchart of a method in which a device selects at least one of a plurality of tasks based on a movement of a hovering input unit and 3D location information of a hovering input according to an exemplary embodiment.

FIG. 12 is a flowchart of a method in which the device 100 selects at least one of a plurality of tasks based on a movement of a hovering input unit and 3D location information of a hovering input according to an exemplary embodiment.

In operation S1210, the device 100 may obtain the hovering input. The device 100 may obtain the hovering input by detecting changed capacitance according to the hovering input unit held by a user at a location near the device 100.

In operation S1220, the device 100 may determine a type of the hovering input based on the movement of the hovering input unit. The device 100 may determine the type of the hovering input according to a moving direction of the hovering input unit. For example, the device 100 may identify a first hovering input corresponding to a case in which the hovering input unit moves in a first direction and a second hovering input corresponding to a case in which the hovering input unit moves in a second direction.

In operation S1230, the device 100 may determine an operation corresponding to the type of the hovering input among a plurality of operations relating to an operation of an application. The device 100 may determine the operation corresponding to the determined type of the hovering input by using metadata of the application. The metadata of the application may include information regarding the plurality of operations that may be performed when the application is executed and the type of hovering input used for performing each of the plurality of operations.

For example, when a video player application is executed, the device 100 may select an operation of fast-forwarding a video from the first hovering input that moves in an opposite direction of a screen of the device 100. The device 100 may select an operation of rewinding the video from the second hovering input that moves in a direction of the screen of the device 100.

In operation S1240, the device 100 may select a method of performing the selected operation based on 3D location information of the obtained hovering input.

In operation S1250, the device 100 may perform the selected task based on an obtained execution input.

Operation S1250 may correspond to operation S230 described with reference to FIG. 2 above.

FIGS. 13A and 13B are diagrams illustrating a method in which the device 100 performs at least one of a plurality of tasks based on a movement of a hovering input unit 1310 (1310a, 1310b) and 3D location information of a hovering input according to an exemplary embodiment.

When the hovering input is obtained, the device 100 may select and perform one of the plurality of tasks relating to a first operation of an application executed by the device 100. The device 100 may determine an operation relating to the first operation based on the moving direction of the hovering input unit 1310 (1310a, 1310b), and determine a method of performing the determined operation based on a distance between the hovering input unit 1310 (1310a, 1310b) and the device 100, thereby selecting one of the plurality of tasks. In this regard, the method of performing the operation may be different according to a direction in which the operation is performed, a speed for performing the operation, a performing unit used to perform the operation, etc.

Referring to FIGS. 13A and 13B, when a music play application is executed, the device 100 may select a task of fast-forwarding music from a first hovering input generated by the hovering input unit 1310 (1310a, 1310b) that moves in an opposite direction of a screen of the device 100. The device 100 may select a task of rewinding the music from a second hovering input generated by the hovering input unit 1310 that moves in a direction of the screen of the device 100.

The device 100 may determine a method of performing the selected task based on the 3D location information of the obtained hovering input. For example, when location information of the first hovering input is z1, the device 100 may select a task of fast-forwarding the music two times. When the location information of the first hovering input is z2, the device 100 may select a task of fast-forwarding the music four times. When the location information of the first hovering input is z3, the device 100 may select a task of fast-forwarding the music six times.

According to another example, when location information of the second hovering input is z4, the device 100 may select the task of rewinding the music two times. When the location information of the second hovering input is z5, the device 100 may select the task of rewinding the music four times. When the location information of the second hovering input is z3, the device 100 may select the task of rewinding the music six times.

Figure 14A:
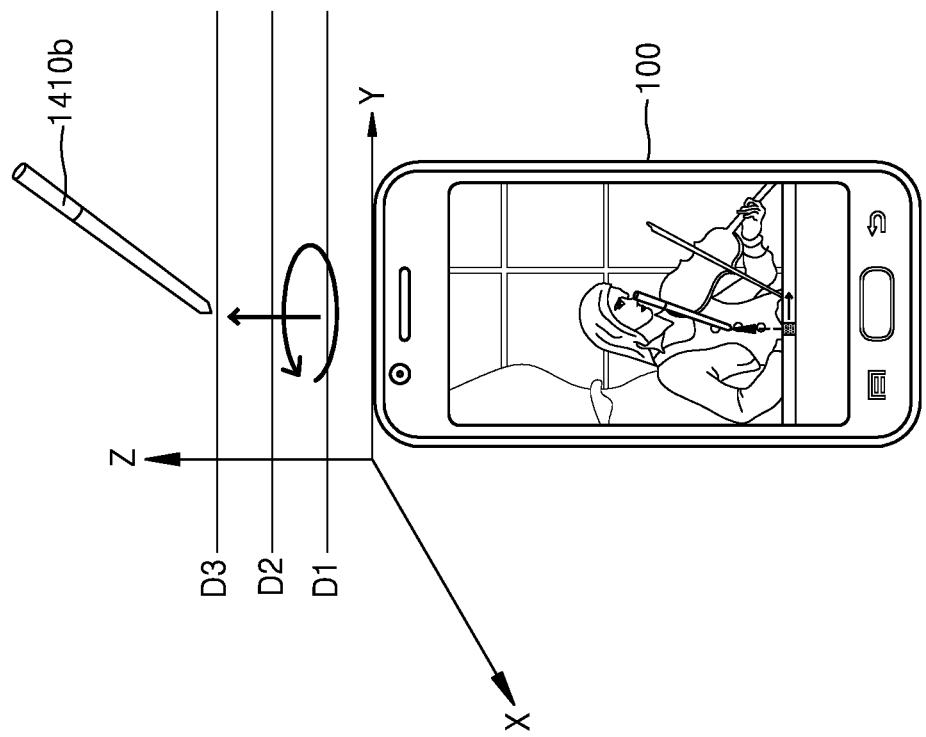
FIGS. 14A and 14B are diagrams illustrating a method in which a device performs at least one of a plurality of tasks based on a moving pattern of a hovering input unit and 3D location information of a hovering input according to an exemplary embodiment.
Figure 14B:
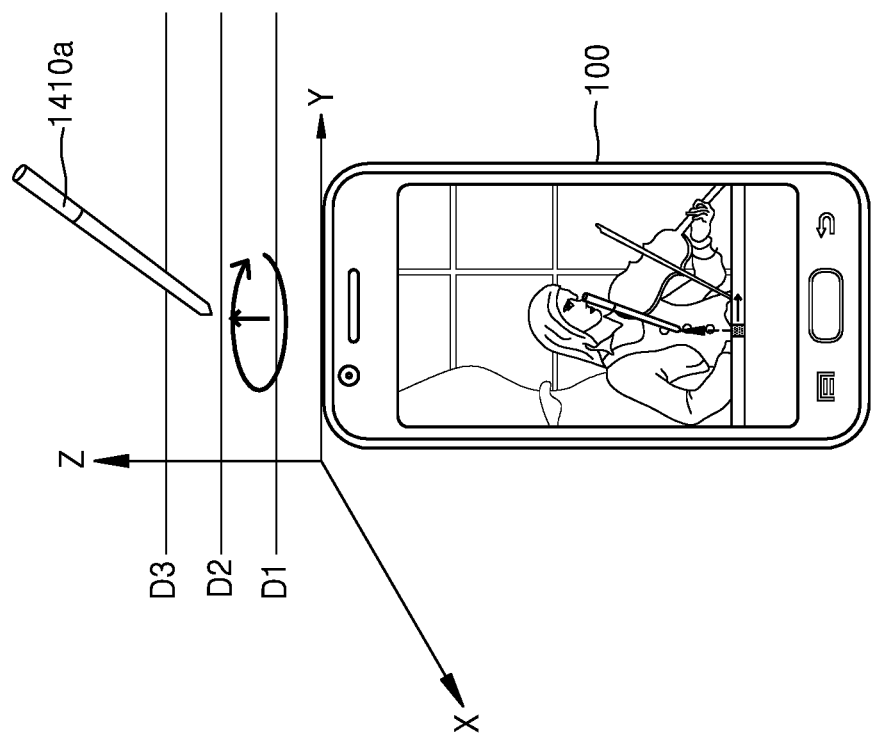

FIGS. 14A and 14B are diagrams illustrating a method in which the device 100 performs at least one of a plurality of tasks based on a moving pattern of a hovering input unit 1410 and 3D location information of a hovering input according to an exemplary embodiment.

When the hovering input is obtained, the device 100 may select and perform one of the plurality of tasks relating to a first operation of an application executed by the device 100. The device 100 may determine an operation relating to the first operation based on the moving pattern of the hovering input unit 1410 (1410a, 1410b), and determine a method of performing the determined operation based on a distance between the hovering input unit 1410 (1410a, 1410b) and the device 100, thereby selecting one of the plurality of tasks. In this regard, the method of performing the operation may be different according to a direction in which the operation is performed, a speed for performing the operation, a performing unit used to perform the operation, etc.

Referring to FIGS. 14A and 14B, when a video player application is executed, the device 100 may select an operation of fast-forwarding a video from a first hovering input generated by the hovering input unit 1410a that moves clockwise. The device 100 may select an operation of rewinding the video from a second hovering input generated by the hovering input unit 1410b that moves counterclockwise.

The device 100 may determine a method of performing the selected operation based on the 3D location information of the obtained hovering input. For example, when location information of the first hovering input is D1, the device 100 may select a task of fast-forwarding the video two times. When the location information of the first hovering input is D2, the device 100 may select a task of fast-forwarding the video four times. When the location information of the first hovering input is D3, the device 100 may select a task of fast-forwarding the video six times.

According to another example, when location information of the second hovering input is D1, the device 100 may select a task of rewinding the video two times. When the location information of the second hovering input is D2, the device 100 may select a task of rewinding the video four times. When the location information of the second hovering input is D3, the device 100 may select a task of rewinding the video six times. These are merely exemplary. The present disclosure is not limited to these.

Figure 15:
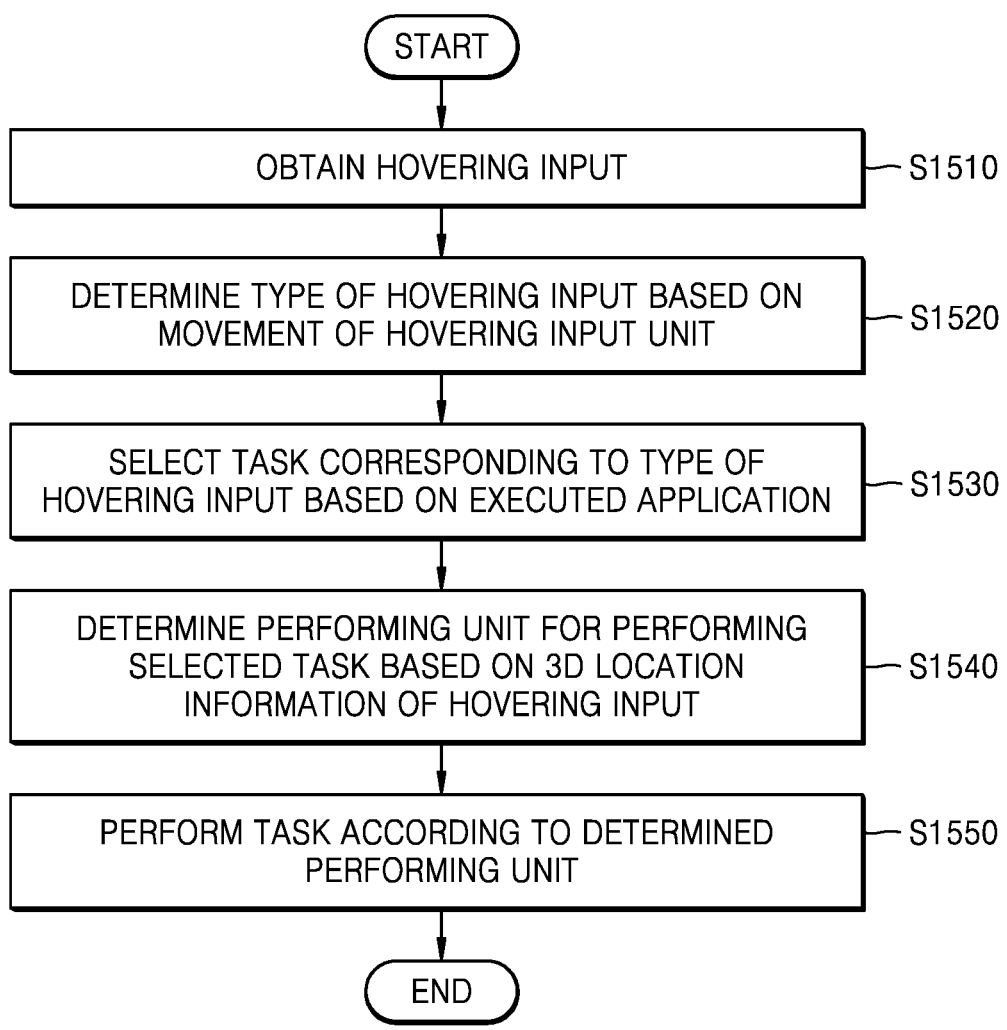
FIG. 15 is a flowchart of a method in which a device performs a task according to a determined performing unit based on 3D location information of a hovering input according to an exemplary embodiment.

FIG. 15 is a flowchart of a method in which the device 100 performs a task according to a determined performing unit based on 3D location information of a hovering input according to an exemplary embodiment.

In operation S1510, the device 100 may obtain the hovering input. The device 100 may obtain the hovering input by detecting changed capacitance according to a hovering input unit held by a user at a location near the device 100.

In operation S1520, the device 100 may determine a type of the obtained hovering input based on a movement of the hovering input unit.

The device 100, according to an exemplary embodiment, may determine a type of the hovering input based on the movement of the hovering input unit. The device 100 may determine the type of the hovering input according to a moving pattern of the hovering input unit. In this regard, the pattern may be formed according to a moving direction of the hovering input unit, a moving shape of the hovering input unit, a detected time of the hovering input unit, a moving speed of the hovering input unit, a detected location of the hovering input unit, etc.

For example, the device 100 may determine that the obtained hovering input is a first hovering input generated according to the hovering input unit that draws a circle clockwise. For another example, the device 100 may determine that the obtained hovering input is a second hovering input generated according to the hovering input unit that stops for more than 3 seconds.

According to another exemplary embodiment, the device 100 may determine the type of the hovering input according to an object corresponding to the detected location of the hovering input unit. In this regard, the object may include an identification mark (e.g., an icon) displayed on a screen of the device 100 indicating each of a plurality of tasks relating to an operation of an application.

The device 100 may determine an object corresponding to the location of the hovering input unit among one or more objects indicating the plurality of tasks by using location information of the hovering input unit. The device 100 may determine the type of the hovering input according to a type of the corresponding object. For example, the device 100 may determine a progress bar corresponding to the detected location of the hovering input unit when a video player application is executed. The device 100 may determine that the obtained hovering input is a third hovering input corresponding to the progress bar.

In operation S1530, the device 100 may select a task corresponding to the determined type of the hovering input based on an application executed by the device 100.

The device 100 may select the task corresponding to the determined type of the hovering input among a plurality of tasks that may be performed. For example, the device 100 may select the task corresponding to the determined type of the hovering input by using metadata of the application. The metadata of the application may include the type of the obtained hovering input and information regarding the tasks that may be performed when the application is executed.

In operation S1540, the device 100 may determine the performing unit (e.g., multiplier) for performing the selected task based on the 3D location information of the obtained hovering input. An operation performing accuracy may be determined according to the performing unit.

For example, when a user explores a specific frame in the video player application, the device 100 may determine a unit of the explored frame based on the 3D location information of the obtained hovering input. For example, when the hovering input unit is detected at a first depth, the device 100 may determine the unit of the explored frame as one. When the hovering input unit is detected at a second depth, the device 100 may determine the unit of the explored frame as ten.

According to another example, when the user displays a photo of a next page in a photo storing application, the device 100 may determine a unit of turned pages based on the 3D location information of the hovering input. For example, when the hovering input unit is detected at the first depth, the device 100 may determine the unit of the turned pages as one. When the hovering input unit is detected at the second depth, the device 100 may determine the unit of the turned pages as ten.

In operation S1550, the device 100 may perform the selected task according to the determined performing unit.

For example, when the video player application is executed, the device 100 may explore a video play section in the determined ten frame unit. When the photo storing application is executed, the device 100 may turn over pages on which photos are stored according to the determined page unit.

Figure 16A:
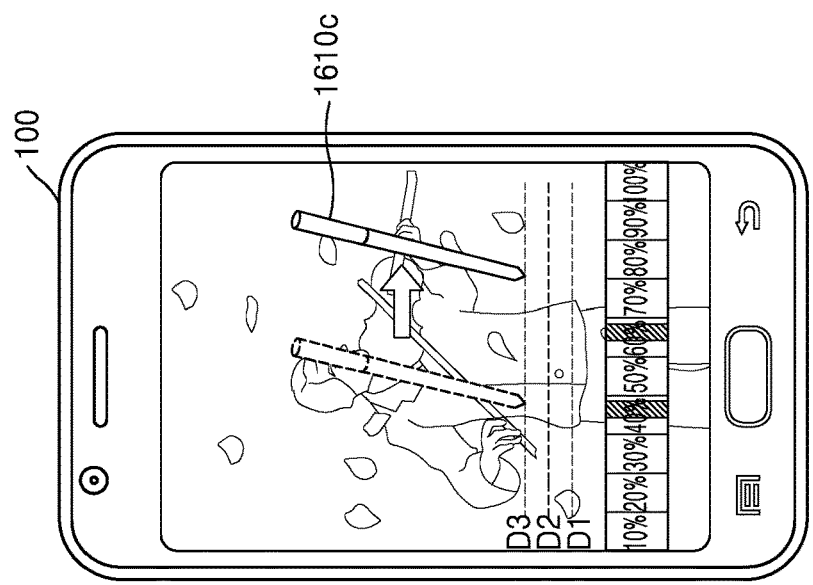
FIGS. 16A through 16C are diagrams illustrating a method in which a device performs a task according to a determined performing unit based on 3D location information of a hovering input when a video player application is executed according to an exemplary embodiment.
Figure 16B:
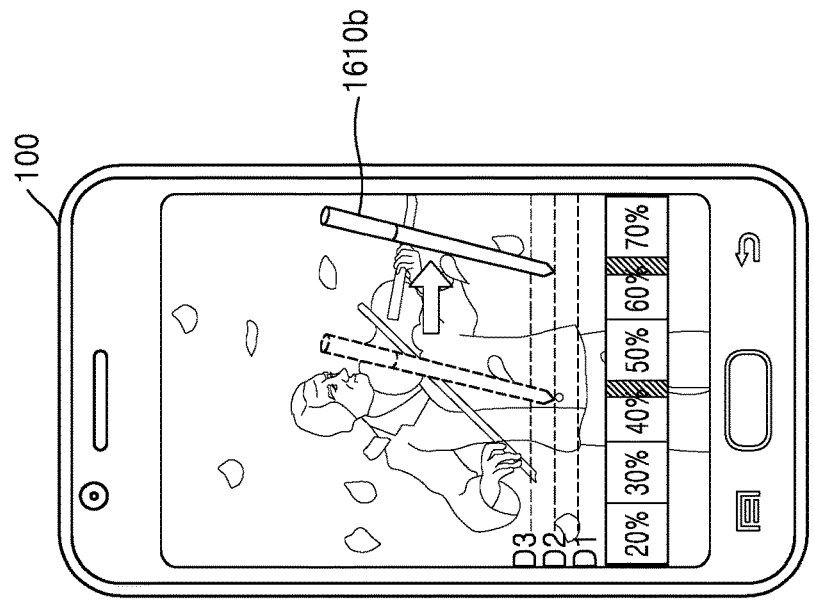
Figure 16C:
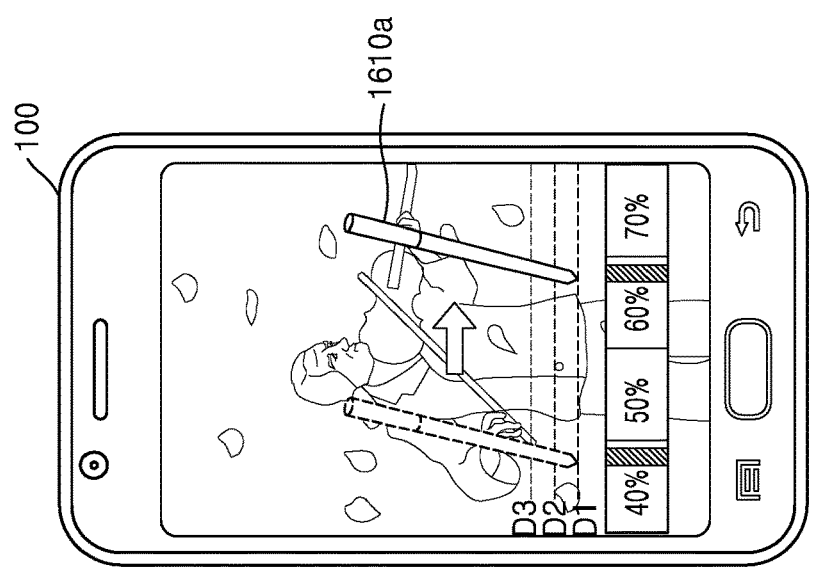

FIGS. 16A through 16C are diagrams illustrating a method in which the device 100 performs a task according to a determined performing unit based on 3D location information of a hovering input when a video player application is executed according to an exemplary embodiment.

Referring to FIGS. 16A through 16C, the device 100 may detect a hovering input unit 1610 (1610a, 1610b, 1610c) at a location corresponding to a progress bar when the video player application is executed. The device 100 may determine a type of the hovering input generated when the hovering input unit 1610 (1610a, 1610b, 1610c) is detected at the location corresponding to the progress bar using metadata of an application. The device 100 may select the task corresponding to the determined type of the hovering input using the metadata of the application.

For example, when the hovering input unit 1610 (1610a, 1610b, 1610c) is detected at the location corresponding to the progress bar, the device 100 may determine the generated hovering input as a first hovering input. The device 100 may select a task that explores a video play section corresponding to the determined first hovering input using the metadata of the application.

Device 100 may determine a performing unit used to perform the selected task according to a 3D location at which the hovering input unit 1610 is detected.

Referring to FIG. 16A, the device 100 may detect the hovering input unit 1610a at a first depth D1. The device 100 may determine the performing unit used to perform the selected task that explores the video play section using the 3D location information that is the first depth D1. For example, when the hovering input unit 1610 is detected at the first depth D1, the device 100 may determine a unit of an explored frame as one.

Referring to FIG. 16B, the device 100 may detect the hovering input unit 1610b at a second depth D2. The device 100 may determine the performing unit used to perform the selected task that explores the video play section using the 3D location information that is the second depth D2. For example, when the hovering input unit 1610 is detected at the second depth D2, the device 100 may determine a unit of an explored frame as ten.

Referring to FIG. 16C, the device 100 may detect the hovering input unit 1610c at a third depth D3. The device 100 may determine the performing unit used to perform the selected task that explores the video play section using the 3D location information that is the third depth D3. For example, when the hovering input unit 1610 is detected at the third depth D3, the device 100 may determine a unit of an explored frame as twenty.

Figure 17:
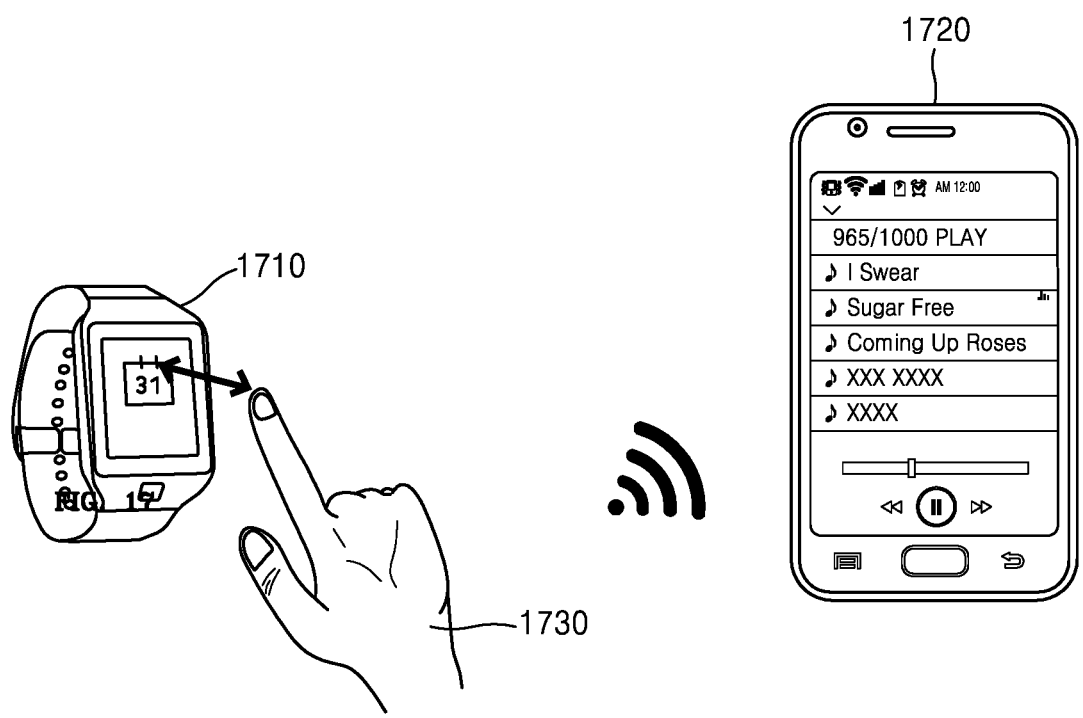
FIG. 17 is a diagram illustrating a system for controlling a device according to an exemplary embodiment.

FIG. 17 is a diagram illustrating a system for controlling a device according to an exemplary embodiment.

The system for controlling the device may include a first device 1710 and a second device 1720. However, all of the elements illustrated in FIG. 17 are not required. The system for controlling the device may be embodied with more or less elements than those illustrated in FIG. 17.

The first device 1710 may obtain characteristic information including 3D location information of an obtained hovering input. In this regard, the 3D location information of the hovering input may be determined based on a distance between a hovering input unit 1730 that generates the hovering input and the first device 1710.

When the hovering input unit 1730 that generates the hovering input moves, the characteristic information may include information regarding at least one of a moving shape and a moving direction of the hovering input unit 1730.

The first device 1710 may transmit the obtained characteristic information to the second device 1720. The second device 1720 may determine a type of the hovering input obtained by the first device 1710 based on the received characteristic information. For example, the second device 1720 may determine a first hovering input having 3D location information of a first depth and a second hovering input having 3D location information of a second depth as different types. The second device 1720 may determine hovering inputs in which at least one of the moving shape and the moving direction of the hovering input unit 1730 is different, as different types.

The second device 1720 may select at least one task corresponding to the determined type of the hovering input based on an operation of an executed application. In this regard, the at least one task may be included in a plurality of tasks relating to the operation of the application executed by the second device 1720.

When an execution input is obtained, the second device 1720 may perform the selected at least one task. The second device 1720 may obtain the execution input directly from a user and may receive the execution input that is obtained by the first device 1710 from the user.

The second device 1720 may previously store information regarding an execution input corresponding to the obtained hovering input. The second device 1720 may determine whether the obtained execution input corresponds to the obtained hovering input based on the previously stored information. When the obtained execution input corresponds to the obtained hovering input, the second device 1720 may perform the selected at least one task. When the second device 1720 performs the selected at least one task, a result of performing the task may be output on the second device 1720. According to another example, when the second device 1720 performs the selected at least one task, a result of performing the task may be output on the first device 1710.

Figure 18:
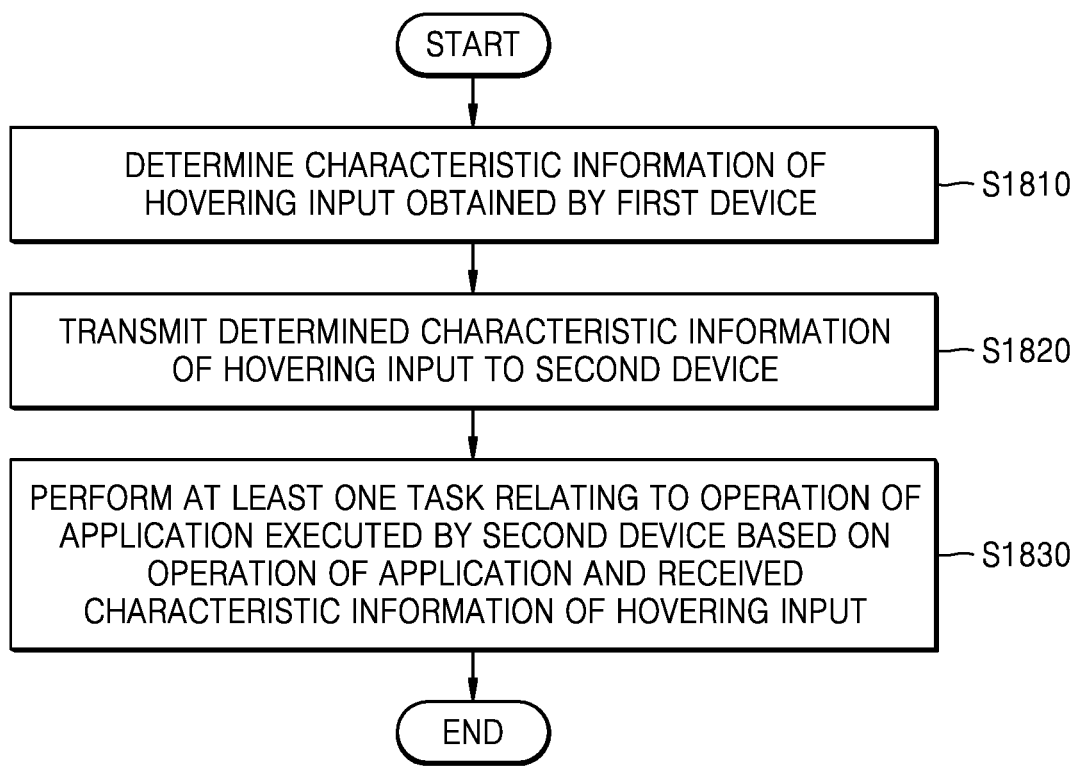
FIG. 18 is a flowchart illustrating a device control method performed by a system for controlling a device according to an exemplary embodiment.

FIG. 18 is a flowchart illustrating a device control method performed by a system for controlling a device according to an exemplary embodiment.

In operation S1810, the first device 1720 may determine characteristic information of an obtained hovering input. The first device 1720 may obtain the characteristic information including 3D location information of the obtained hovering input. When the hovering input unit 1730 that generates the hovering input moves, the characteristic information may include information regarding at least one of a moving shape and a moving direction of the hovering input unit 1730.

In operation S1820, the first device 1710 may transmit the determined characteristic information of the obtained hovering input to the second device 1720.

In operation S1830, the second device 1720 may perform at least one of a plurality of tasks relating to an operation of an application executed by the second device 1720 based on the operation of the application and the received characteristic information of the hovering input. A method in which the second device 1720 performs the at least one task based on the operation of the executed application and the received characteristic information of the hovering input may correspond to a method in which the device 100 performs at least one task described with reference to FIGS. 1 through 16 above.

The second device 1720 may output a result of performing the at least one task to the second device 1720 or the first device 1710 based on a setting of the application or a user input.

Figure 19A:
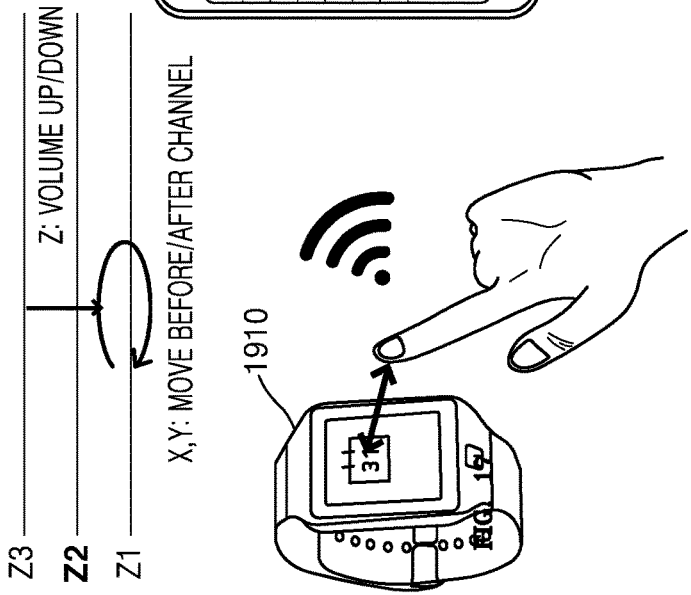
FIGS. 19A and 19B are diagrams illustrating a method in which a system for controlling a device controls a device and a second device according to an exemplary embodiment.
Figure 19B:
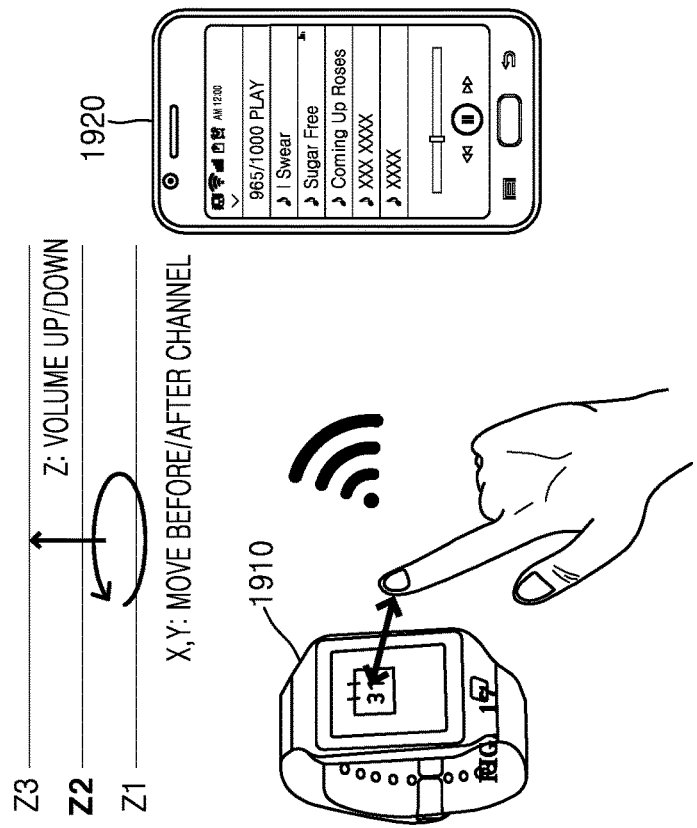

FIGS. 19A and 19B are diagrams illustrating a method in which a system for controlling a device controls a first device 1910 and a second device 1920 according to an exemplary embodiment.

Referring to FIGS. 19A and 19B, the second device 1920 may execute a music play application. A user may transmit a hovering input to the first device 1910 to control the volume of music played by the second device 1920.

For example, the user may transmit the hover input to the first device 1910 by holding a hovering input unit (for example, a finger) over the first device 1910. The first device 1910 may determine characteristic information based on a distance between the hovering input unit and the first device 1910 in response to the obtained hovering input. According to another example, the first device 1910 may determine the characteristic information of the hovering input based on at least one of a moving direction and a moving shape of the hovering input unit that generates the hovering input.

Referring to FIG. 19A, the first device 1910 may transmit the characteristic information of the hovering input having 3D location information as z2 and a counterclockwise moving pattern to the second device 1920. The second device 1920 may select an operation corresponding to the hovering input having the 3D location information as z2 and the counterclockwise moving pattern based on metadata regarding play of previously stored music. For example, the second device 1920 may select an operation of turning up the volume of music based on the counterclockwise moving pattern of the hovering input. The second device 1920 may select an operation of turning up the volume to a level corresponding to the hovering input having the 3D location information as z2.

Referring to FIG. 19B, the first device 1910 may transmit the characteristic information of the hovering input having 3D location information as z2 and a clockwise moving pattern to the second device 1920. The second device 1920 may select an operation corresponding to the hovering input having the 3D location information as z2 and the clockwise moving pattern based on metadata regarding play of previously stored music. For example, the second device 1920 may select an operation of turning down the volume of music based on the clockwise moving pattern of the hovering input. The second device 1920 may select an operation of turning down the volume to a level corresponding to the hovering input having the 3D location information as z2.

FIGS. 20A and 20B are diagrams illustrating a method in which a system for controlling a device controls a first device 2010 and a second device 2020 according to another exemplary embodiment.

Referring to FIGS. 20A and 20B, the second device 2020 may include smart glasses including a glass shaped display. The second device 2020 illustrated in FIGS. 20A and 20B may execute a map application providing a user with location information. The user may transmit a hovering input to the first device 2010 to control the second device 2020 to collect output maps.

For example, the user may transmit the hovering input to the first device 2010 by holding a hovering input unit (for example, a finger) on the first device 2010. The first device 2010 may determine characteristic information based on a distance between the hovering input unit and the first device 2010 in response to the obtained hovering input. According to another example, the first device 2010 may determine the characteristic information of the hovering input based on at least one of a moving direction and a moving shape of the hovering input unit that generates the hovering input.

Referring to FIG. 20A, the first device 2010 may transmit the characteristic information of the hovering input having 3D location information as z1 and a moving pattern in a direction toward the first device 2010 to the second device 2020. The second device 2020 may select an operation corresponding to the hovering input having the 3D location information as z1 and the moving pattern in the direction toward the first device 2010 based on metadata of a previously stored map application. For example, the second device 2020 may select an operation of reducing a scale of a map based on the moving pattern in the direction toward the first device 2010 of the hovering input. The second device 2020 may select an operation of reducing the scale of the map as much as a size corresponding to the hovering input having the 3D location information as z1.

The second device 2020 may change and transmit the scale of the map displayed on the selected operation to the first device 2010. The first device 2010 may receive and output the map on the changed scale.

Referring to FIG. 20B, the first device 2010 may transmit the characteristic information of the hovering input having 3D location information as z6 and a moving pattern in a direction opposite to the first device 2010 to the second device 2020. The second device 2020 may select an operation corresponding to the hovering input having the 3D location information as z6 and the moving pattern in the direction opposite to the first device 2010 based on the metadata of the previously stored map application. For example, the second device 2020 may select an operation of increasing the scale of the map based on the moving pattern in the direction opposite to the first device 2010 of the hovering input. The second device 2020 may select an operation of increasing the scale of the map as much as the size corresponding to the hovering input having the 3D location information as z6.

The second device 2020 may change and transmit the scale of the map displayed on the selected operation to the first device 2010. The first device 2010 may receive and output the map on the changed scale.

Figure 21:
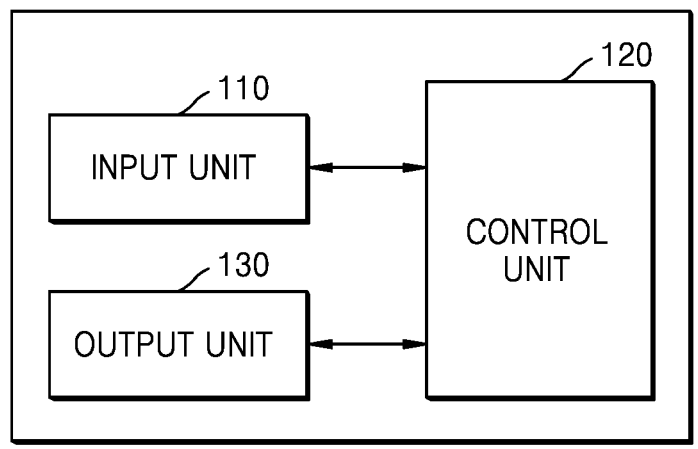
FIGS. 21 and 22 are block diagrams illustrating a configuration of a device according to an exemplary embodiment.
Figure 22:
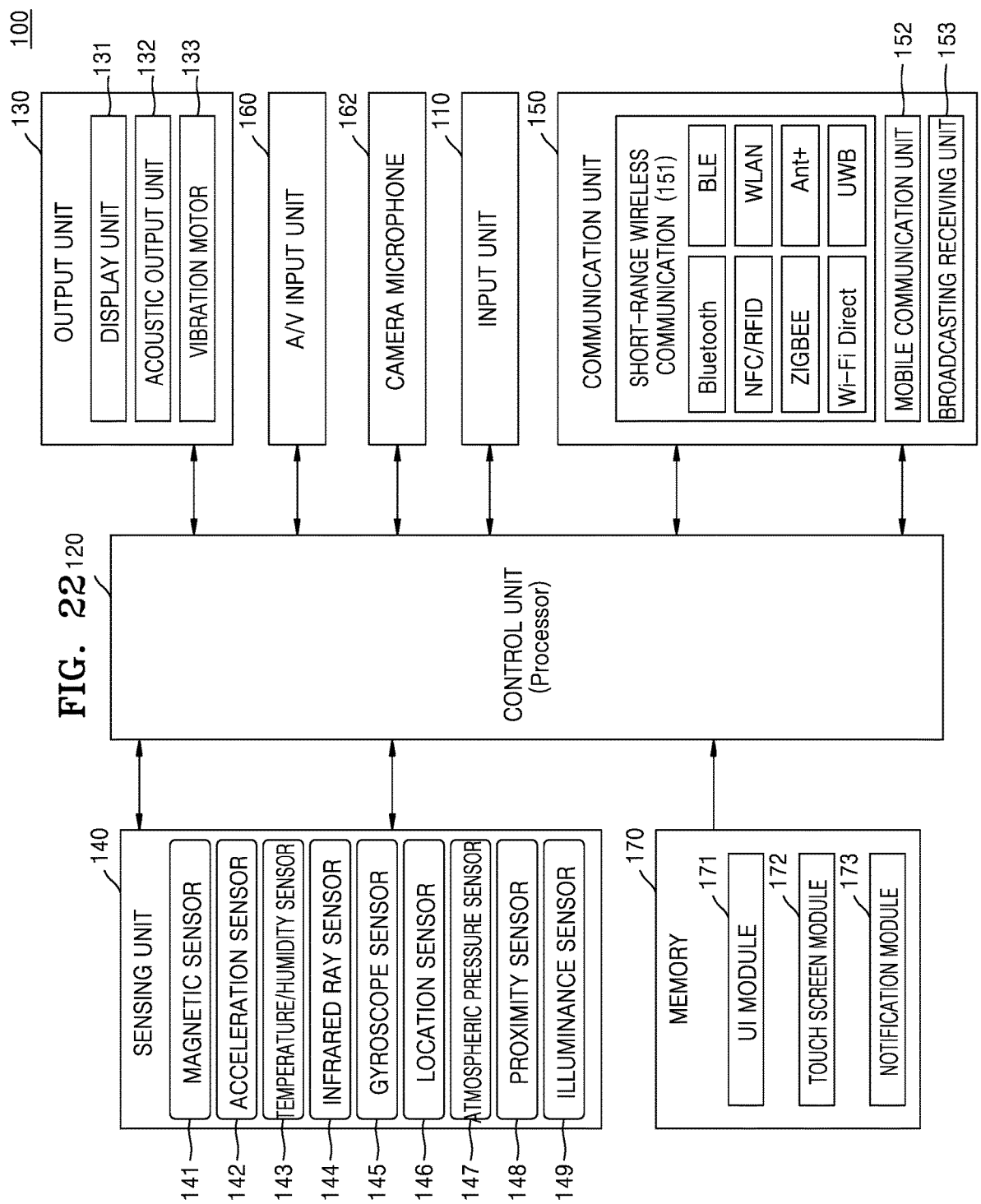

FIGS. 21 and 22 are block diagrams illustrating a configuration of the device 100 according to an exemplary embodiment.

As shown in FIG. 21, the device 100 according to an exemplary embodiment may include an input unit 110 (e.g., input interface), a control unit 120 (e.g., controller, processor), and an output unit 130 (e.g., output interface). However, all of the elements illustrated in FIG. 21 are not required elements. The device 100 may be embodied with more or less elements than those illustrated in FIG. 21.

For example, as shown in FIG. 22, the device 100 according to an exemplary embodiment may further include a sensing unit 140, a communication unit 150 (e.g., communicator), an audio/video (A/V) input unit 160 (e.g., A/V input interface), and a memory 170 other than the input unit 110 (e.g., input interface), the control unit 120, and the output unit 130.

The input unit 110 is an interface for a user to input data for controlling the device 100. For example, the input unit 110 may include a key pad, a dome switch, a touch pad (electrostatic capacitive type, resistive type, IR detecting type, surface acoustic wave type, integral tension detection type, piezoelectric type, etc.), a jog wheel, or a jog switch, but is not limited thereto.

The input unit 110 may obtain various types of user inputs. For example, the input unit 110 may obtain a hovering input based on a method of changing capacitance detected by the device 100 from the user. The input unit 110 may continuously obtain inputs within a preset period of time. For example, the input unit 110 may obtain an execution input in association with the hovering input within the preset period of time after obtaining the hovering input.

The control unit 120 may control the overall operation of the device 100. For example, the control unit 120 may control the input unit 110, the output unit 130, the sensing unit 140, the communication unit 150, and the A/V input unit 160 by executing programs stored in the memory 170.

The control unit 120 may obtain characteristic information of the obtained hovering input. In this regard, the characteristic information may include at least one of a distance between a hovering input unit that generates the hovering input and the device 100 and information regarding a movement of the hovering input unit. The control unit 120 may select at least one of a plurality of tasks relating to an operation of an application executed by the device 100 based on the operation of the application and 3D location information of the hovering input.

When the hovering input is detected, the control unit 120 may determine a distance between the hovering input unit and the device 100 and obtain the 3D location information of the hovering input based on the determined distance. The control unit 120 may determine a type of the hovering input according to the 3D location information of the hovering input. The control unit 120 may select at least one of the plurality of tasks relating to the operation of the executed application based on the determined type of the hovering input.

The control unit 120 may obtain information regarding an x coordinate, y coordinate that is 2D location information of the hovering input unit. The control unit 120 may determine an object corresponding to a location of the hovering input unit that generates the hovering input among one or more objects indicating the plurality of tasks and output according to the operation of the application.

According to an exemplary embodiment, when the application is executed, the control unit 120 may select at least one of a plurality of applications that may be executed by a device indicating at least one of objects output by the device based on the 3D location information of the hovering input. According to another exemplary embodiment, the control unit 120 may obtain information regarding a moving direction of the hovering input unit that generates the hovering input. The control unit 120 may select an operation corresponding to the moving direction of the hovering input unit and determine a method of performing the selected operation based on the 3D location information of the hovering input.

According to another exemplary embodiment, the control unit 120 may determine a type of the obtained hovering input based on a moving shape of the hovering input unit. The control unit 120 may select at least one operation corresponding to the determined type of the hovering input and determine a method of performing the selected operation based on the 3D location information of the hovering input.

The control unit 120 may determine whether the execution input obtained from the input unit 110 corresponds to the hovering input based on previously stored database of the application.

The output unit 130 may be used to output an audio signal, a video signal, or a vibration signal and may include a display unit 131, an acoustic output unit 132, and a vibration motor 133.

The display unit 131 may display information processed by the device 100. The display unit 131 may output a result obtained by performing at least one task selected when a type of the execution input obtained from the input unit 110 corresponds to a preset type according to a previously obtained hovering input.

The display unit 131 may output an application relating to an operation of the executed application or an identification mark indicating the operation. For example, the identification mark may include an icon, etc.

If the display unit 131 and a touch pad are arranged as layers and constitute a touch screen, the display unit 131 may be used as an output device and an input device. The display unit 131 may include at least one of a liquid crystal display (LCD), a thin-film transistor (TFT) LCD, an organic light emitting diode, a flexible display, a 3D display, and an electrophoretic display. Furthermore, according to one or more exemplary embodiments, the device 100 may include two or more display units 131. Here, the two or more display units 131 may be arranged to face each other via a hinge.

The acoustic output unit 132 outputs audio data received via the communication unit 150 or stored in the memory 170. Furthermore, the acoustic output unit 132 outputs acoustic signals related to functions performed by the device 100 (e.g., a call signal reception sound, a message reception sound, a notification sound, etc.). The acoustic output unit 142 may include a speaker or a buzzer.

The vibration motor 133 may output a vibration signal. For example, the vibration motor 133 may output a vibration signal corresponding to output of audio data or video data (e.g., a call signal reception sound, a message reception sound, etc.). Furthermore, the vibration motor 133 may output a vibration signal when a touch is input to a touch screen.

The sensing unit 140 may detect a state of the device 100 or a state of a periphery of the device 100 and transfer the detected information to the control unit 120. For example, the sensing unit 140 may detect a reference operation of the user regarding review content 105 and transfer the detected reference operation to the control unit 120.

The sensing unit 140 may include at least one of a magnetic sensor 141, an acceleration sensor 142, a temperature/humidity sensor 143, an infrared ray sensor 144, a gyroscope sensor 145, a location sensor 146, an atmospheric pressure sensor 147, a proximity sensor 148, and an illuminance sensor 149, but is not limited thereto.

The communication unit 150 (e.g., communicator) may include one or more elements enabling communication between the device 100 and an external device or between the device 100 and a server. For example, the communication unit 150 may include a short-range wireless communication unit 151, a mobile communication unit 152, and a broadcasting receiving unit 153 (e.g., broadcast receiver).

The short-range wireless communication unit 151 may include a Bluetooth communication unit, a Bluetooth Low Energy (BLE) communication unit, a near field communication (NFC) unit, a WLAN (Wi-Fi) communication unit, a Zigbee communication unit, an infrared data association (IrDA) communication unit, a Wi-Fi direct (WFD) communication unit, an ultra wideband (UWB) communication unit, or an Ant+ communication unit.

The mobile communication unit 152 (e.g., mobile communicator) transmits and receives wireless signals to and from at least one of a station, an external terminal, and a server on a mobile communication network. In this regard, the wireless signals may include voice call signals, video call signals, or various types of data regarding transmission/reception of text/multimedia messages.

The broadcasting receiving unit 153 receives broadcasting signals and/or information regarding broadcasting from outside via broadcasting channels. Broadcasting channels may include satellite channels and ground wave channels. According to one or more exemplary embodiments, the device 100 may not include the broadcasting receiving unit 153.

The A/V input unit 160 is a unit for inputting audio signals or video signals and may include a camera 161 and a microphone 162. The camera 161 may obtain an image frame including a still image or a moving picture via an image sensor in a video call mode or an image pickup mode. An image captured by the image sensor is processed by the control unit 120 or a separate image processing unit.

An image frame processed by the camera 161 may be stored in the memory 170 or transmitted to outside via the communication unit 160. According to one or more exemplary embodiments, the device 100 may include two or more cameras 161.

The microphone 162 receives an external acoustic signal and processes the external acoustic signal into digital voice signal. For example, the microphone 162 may receive acoustic signals from an external device or a speaker. The microphone 162 may utilize various noise reduction algorithms to reduce noises during reception of external acoustic signals.

The memory 170 may store programs used by the control unit 120 for processing data and controlling components of the device 100 or input/output data (e.g., a plurality of menus, a plurality of first layer sub menus respectively corresponding to the plurality of menus, a plurality of second layer sub menus respectively corresponding to the plurality of first layer sub menus, etc.)

The memory 170 may include at least one of storage media including a flash memory type storage medium, a multimedia card micro type storage medium, a card type memory (e.g., a SD memory, a XD memory), a random access memory (RAM), a static RAM (SRAM), a read-only memory (ROM), an electrically erasable-programmable ROM (EEPROM), a programmable ROM (PROM), a magnetic memory, a magnetic disk, and an optical disc. Furthermore, the device 100 may utilize a web storage or a cloud server that functions as the memory 170 on the internet.

Programs stored in the memory 170 may be categorized into a plurality of modules, e.g., a UI module 171 (e.g., user interface), a touch screen module 172 (e.g., touchscreen), a notification module 173 (e.g., event notifier), etc.

The UI module 171 may provide a UI or a GUI that is customized to an application and works in conjunction with the device 100. The touch screen module 172 may detect a touch gesture of a user on a touch screen and transmit information regarding the touch gesture to the control unit 120. The touch screen module 172, according to an exemplary embodiment, may recognize and analyze a touch code. The touch screen module 172 may also be embodied as a separate hardware unit including a controller.

Various sensors may be arranged inside or nearby a touch screen to detect a touch or a proximity touch on the touch screen. An example of a sensor for detecting a touch on a touch screen may be a tactile sensor. A tactile sensor refers to a sensor for detecting contact of an object having a sensitivity greater than or equal to the sense of touch. A tactile sensor may detect various information, such as roughness of a contact surface, hardness of a contacting object, a temperature at a contact point, etc.

Another example of a sensor for detecting a touch on a touch screen may be a proximity sensor. A proximity sensor refers to a sensor that detects existence of an object approaching to a designated detection surface or a nearby object using electromagnetic force or an infrared ray (IR) without a mechanical contact. Examples of proximity sensors include a transmissive photoelectric sensor, a direct-reflection type photoelectric sensor, a mirror-reflection type photoelectric sensor, a high-frequency wave emission type proximity sensor, an electrostatic capacitance type proximity sensor, a magnetic type proximity sensor, and an IR proximity sensor. Touch gestures of a user may include tapping, touch & hold, double tapping, dragging, panning, flicking, drag-and-drop, and swiping.

The notification module 173 may generate a signal for notifying an event occurring at the device 100. Examples of events occurring at the device 100 may include reception of a call signal, reception of a message, input of a key signal, notification of a schedule, and acquisition of a user input. The notification module 173 may output notification signals in the form of video signals via the display unit 131, in the form of audio signals via the acoustic output unit 132, or in the form of vibration signals via the vibration motor 133.

Figure 23:
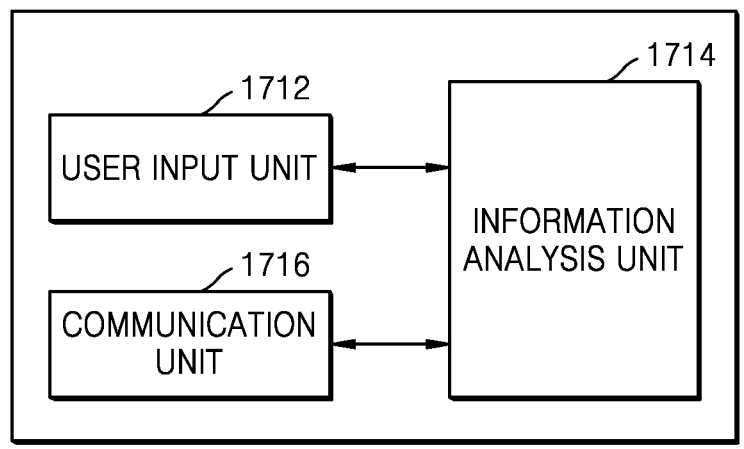
FIG. 23 is a block diagram illustrating a configuration of a device included in a system for controlling a device according to an exemplary embodiment.

FIG. 23 is a block diagram illustrating a configuration of the first device 1710 included in a system for controlling a device according to an exemplary embodiment.

Referring to FIG. 23, the first device 1710 according to an exemplary embodiment may include a user input unit 1712 (e.g., user input interface), an information analysis unit 1714 (e.g., information analyzer), and a communication unit 1716 (e.g., communicator). However, all of the elements illustrated in FIG. 23 are not required. The first device 1710 may be embodied with more or less elements than those illustrated in FIG. 23.

The user input unit 1712 may obtain a user input. For example, the user input unit 1712 may obtain a hovering input generated according to a change in capacitance detected by the first device 1710.

The information analysis unit 1714 may determine characteristic information of the obtained hovering input. The information analysis unit 1714 may obtain characteristic information including 3D location information of the obtained hovering input. When the hovering input unit 1730 that generates the hovering input moves, the characteristic information may include at least one of a moving shape and a moving direction of the hovering input unit 1730.

The communication unit 1716 may transmit the determined characteristic information of the hovering input to the second device 1720.

One or more exemplary embodiments may be implemented as computer instructions that can be executed by various computer means, and recorded on a computer-readable medium. The computer-readable medium may include program commands, data files, data structures or a combination thereof. Program instructions recorded on the medium may be designed and structured for exemplary embodiments or available to those skilled in the art. Examples of the computer-readable recording medium include magnetic media, such as a hard disk, a floppy disk, and a magnetic tape; optical media, such as a compact disk-read only memory (CD-ROM) and a digital versatile disc (DVD); magneto-optical media, such as floptical disks; a read-only memory (ROM); a random access memory (RAM); and a flash memory. The medium may be a transmission medium, such as an optical or metal line, a waveguide, or carrier waves transferring program commands, data structures, and the like. Program commands may include, for example, a high-level language code that can be executed by a computer using an interpreter, as well as a machine language code made by a complier.

Exemplary embodiments described herein should be considered in a descriptive sense only and not for purposes of limitation. Descriptions of features or aspects within each exemplary embodiment should be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A method of controlling a device, the method comprising:
    displaying an icon including a plurality of representative objects indicating a plurality of applications;
    obtaining 3-dimensional (3D) location information of a hovering inputter on the icon, the 3D location information being determined based on a distance between the device and the hovering inputter, when the hovering inputter is held within a predetermined distance for a predetermined period of time on the icon, wherein the same plurality of representative objects are displayed within the icon while the distance between the device and the hovering inputter is changed; and
    determining an application corresponding to the 3D location information of the hovering inputter among the plurality of applications.

2. The method of claim 1, further comprising:
    determining the icon, among a plurality of icons, corresponding to a 2-dimensional (2D) location of the hovering inputter.

3. The method of claim 1, further comprising:
    executing the determined application in response to an input of the hovering inputter.

4. The method of claim 1, further comprising:
    sensing a gesture through the hovering inputter; and
    comparing the sensed gesture with predetermined gestures.

5. The method of claim 1, further comprising:
    when the application is executed, selecting another application among a plurality of applications indicated by at least one icon, based on the 3D location information of the hovering inputter.

6. The method of claim 1, further comprising:
    receiving information regarding a moving direction of the hovering inputter; and
    determining whether the moving direction of the hovering inputter corresponds to a predetermined gesture.

7. The method of claim 1, further comprising:
    determining a class of a moving pattern of the hovering inputter; and
    determining a task corresponding to the class of the moving pattern.

8. A non-transitory computer readable recording medium having recorded thereon a computer program that, when executed by a computer, performs the method of claim 1.

9. The method of claim 1, wherein the plurality of applications corresponding to the plurality of representative objects displayed within the icon includes a first application and a second application different from the first application, and
    wherein the determining of the application among the plurality of applications comprises determining the first application among the plurality of applications based on the distance between the device and the hovering inputter being a first distance, and determining the second application among the plurality of applications based on the distance between the device and the hovering inputter being a second distance different from the first distance.

10. A method of controlling a first device, the method comprising:
    receiving, from a second device, 3-dimensional (3D) location information of a hovering inputter obtained when the hovering inputter is held within a predetermined distance from the second device for a predetermined period of time on an icon displayed at the second device, the icon including a plurality of representative objects indicating a plurality of applications, the 3D location information being determined based on a distance between the hovering inputter and the second device; and
    determining an application corresponding to the 3D location information of the hovering inputter among a plurality of applications, wherein the same plurality of representative objects are displayed within the icon while the distance between the hovering inputter and the second device is changed.

11. The method of claim 10, wherein movement information of the hovering inputter is further received by the first device.

12. The method of claim 11, wherein a task is identified based on a movement of the hovering inputter, and the task is determined based on the received movement information.

13. The method of claim 10, further comprising:
    execute the determined application in response to an input of the hovering inputter.

14. A non-transitory computer readable recording medium having recorded thereon a computer program that, when executed by a computer, performs the method of claim 10.

15. A device comprising:
    an input interface configured to receive a-an input of a hovering inputter; and
    a processor configured to:
    display an icon including a plurality of representative objects indicating a plurality of applications,
    obtain 3-dimensional (3D) location information of the hovering inputter on the icon, the 3D location information being determined based on a distance between the device and the hovering inputter, when the hovering inputter is held within a predetermined distance for a predetermined period of time on the icon, wherein the same plurality of representative objects are displayed within the icon while the distance between the device and the hovering inputter is changed, and
    determine an application corresponding to the 3D location information of the hovering inputter among the plurality of applications.

16. The device of claim 15, wherein the processor is further configured to determine the icon, among a plurality of icons, corresponding to a 2-dimensional (2D) location of the hovering inputter, and output the determined icon.

17. The device of claim 15, wherein the processor is further configured to execute the determined application in response to an input of the hovering inputter.

18. The device of claim 15, wherein the processor is further configured to control the input interface to sense a gesture through the hovering inputter, and compare the sensed gesture with predetermined gestures.

19. The device of claim 15, wherein when the application is executed, the processor is further configured to select another application among a plurality of applications indicated by at least one icon output by the device, based on the 3D location information of the hovering inputter.

20. The device of claim 15, wherein the processor is further configured to receive information regarding a moving direction of the hovering inputter and determine whether the moving direction of the hovering inputter is corresponds to a predetermined gesture.

21. The device of claim 15, wherein the processor is further configured to determine a class of a moving pattern of the hovering inputter and determine a task corresponding to the class of the moving pattern.

* * * * *